US012764758B2

(12) United States Patent
Khoshnevisan et al.

(10) Patent No.: US 12,764,758 B2
(45) Date of Patent: Oct. 13, 2026

(54) DOWNLINK CONTROL INFORMATION SIZE ALIGNMENT FOR SCHEDULING UPLINK TRANSMISSION

(71) Applicant: QUALCOMM Incorporated, San Diego, CA (US)

(72) Inventors: Mostafa Khoshnevisan, San Diego, CA (US); Yitao Chen, San Marcos, CA (US); Gokul Sridharan, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 285 days.

(21) Appl. No.: 18/585,963

(22) Filed: Feb. 23, 2024

(65) Prior Publication Data

US 2024/0340916 A1 Oct. 10, 2024

Related U.S. Application Data

(60) Provisional application No. 63/494,570, filed on Apr. 6, 2023.

(51) Int. Cl.
*H04W 72/232* (2023.01)
*H04L 5/00* (2006.01)

(52) U.S. Cl.
CPC ......... *H04W 72/232* (2023.01); *H04L 5/0007* (2013.01); *H04L 5/005* (2013.01)

(58) Field of Classification Search
CPC . H04W 72/231; H04W 72/232; H04W 72/12; H04W 72/1268; H04W 72/2123;
(Continued)

(56) References Cited

U.S. PATENT DOCUMENTS

2020/0328840 A1* 10/2020 Salah .................... H04W 24/08
2024/0048320 A1* 2/2024 Sun ....................... H04L 5/0051
(Continued)

FOREIGN PATENT DOCUMENTS

WO 2022213291 A1 10/2022
WO 2023141783 A1 8/2023
(Continued)

OTHER PUBLICATIONS

International Search Report and Written Opinion—PCT/US2024/017303—ISA/EPO—Jun. 25, 2024.
(Continued)

*Primary Examiner* — Mohamed A Kamara
(74) *Attorney, Agent, or Firm* — HARRITY & HARRITY, LLP

(57) ABSTRACT

Various aspects of the present disclosure generally relate to wireless communication. In some aspects, a user equipment (UE) may receive, from a network node, a downlink control information (DCI) message that schedules a physical uplink shared channel (PUSCH) transmission, wherein the DCI message includes: a waveform selection field that indicates a waveform type associated with the PUSCH transmission, and a sounding reference signal (SRS) resource set indication field that indicates a multiple transmission reception point (mTRP) transmission mode or a single transmission reception point (sTRP) transmission mode associated with the PUSCH transmission. The UE may decode the DCI message based on one or more zero padding types associated with one or more fields in the DCI message that depend on one or more of a value of the waveform selection field or a value of the SRS resource set indication field. Numerous other aspects are described.

30 Claims, 13 Drawing Sheets

(58) Field of Classification Search
CPC ..... H04L 5/0007; H04L 5/005; H04L 5/0051; H04L 5/0053; H04L 5/0094; H04L 27/0008; H04L 27/2602
See application file for complete search history.

(56) References Cited

U.S. PATENT DOCUMENTS

| | | | | |
|---|---|---|---|---|
| 2024/0049221 | A1* | 2/2024 | Chen | H04L 5/0035 |
| 2024/0057112 | A1* | 2/2024 | Deghel | H04L 5/0035 |
| 2024/0284451 | A1* | 8/2024 | Park | H04L 5/0094 |
| 2025/0227697 | A1* | 7/2025 | Wu | H04B 7/0639 |

FOREIGN PATENT DOCUMENTS

| | | | |
|---|---|---|---|
| WO | 2023184322 | A1 | 10/2023 |
| WO | 2023196812 | A1 | 10/2023 |

OTHER PUBLICATIONS

Moderator (Interdigital Inc.): “Summary #4 on Dynamic Switching Between DFT-S-OFDM and CP-OFDM”, 3GPP TSG RAN WG1 #110 bis-e, R1-2210749, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Oct. 20, 2022, 51 Pages, XP052260212, The Whole Document.

* cited by examiner

550
Single DCI based SFN PUSCH

800

DOWNLINK CONTROL INFORMATION SIZE ALIGNMENT FOR SCHEDULING UPLINK TRANSMISSION

CROSS-REFERENCE TO RELATED APPLICATION

This Patent application claims priority to U.S. Provisional Patent Application No. 63/494,570, filed on Apr. 6, 2023, entitled "DOWNLINK CONTROL INFORMATION SIZE ALIGNMENT FOR SCHEDULING UPLINK TRANSMISSION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses associated with downlink control information (DCI) size alignment for scheduling uplink transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a network node, a downlink control information (DCI) message that schedules a physical uplink shared channel (PUSCH) transmission, wherein the DCI message includes a waveform selection field that indicates a waveform type associated with the PUSCH transmission, and a sounding reference signal (SRS) resource set indication field that indicates a multiple transmission reception point (mTRP) transmission mode or a single transmission reception point (sTRP) transmission mode associated with the PUSCH transmission. The method may include decoding the DCI message based on one or more zero padding types associated with one or more fields in the DCI message that depend on one or more of a value of the waveform selection field or a value of the SRS resource set indication field.

Some aspects described herein relate to a method of wireless communication performed by a network node. The method may include generating a DCI message that includes a waveform selection field that indicates a waveform type associated with a PUSCH transmission, and an SRS resource set indication field that indicates an mTRP transmission mode or an sTRP transmission mode associated with the PUSCH transmission. The method may include transmitting the DCI message to a UE, wherein one or more fields in the DCI message are associated with one or more zero padding types based on one or more of a value of the waveform selection field or a value of the SRS resource set indication field.

Some aspects described herein relate to a UE for wireless communication. The UE may include a memory and one or more processors coupled to the memory. The one or more processors may be configured to receive, from a network node, a DCI message that schedules a PUSCH transmission, wherein the DCI message includes a waveform selection field that indicates a waveform type associated with the PUSCH transmission, and an SRS resource set indication field that indicates an mTRP transmission mode or an sTRP transmission mode associated with the PUSCH transmission. The one or more processors may be configured to decode the DCI message based on one or more zero padding types associated with one or more fields in the DCI message that depend on one or more of a value of the waveform selection field or a value of the SRS resource set indication field.

Some aspects described herein relate to a network node for wireless communication. The network node may include a memory and one or more processors coupled to the memory. The one or more processors may be configured to generate a DCI message that includes a waveform selection field that indicates a waveform type associated with a PUSCH transmission, and an SRS resource set indication field that indicates an mTRP transmission mode or an sTRP transmission mode associated with the PUSCH transmission. The one or more processors may be configured to transmit the DCI message to a UE, wherein one or more fields in the DCI message are associated with one or more zero padding types based on one or more of a value of the waveform selection field or a value of the SRS resource set indication field.

Some aspects described herein relate to a non-transitory computer-readable medium that stores a set of instructions for wireless communication by a UE. The set of instructions, when executed by one or more processors of the UE, may cause the UE to receive, from a network node, a DCI message that schedules a PUSCH transmission, wherein the DCI message includes a waveform selection field that indicates a waveform type associated with the PUSCH transmission, and an SRS resource set indication field that indicates an mTRP transmission mode or an sTRP transmission mode associated with the PUSCH transmission. The set of instructions, when executed by one or more processors of the UE, may cause the UE to decode the DCI message based on one or more zero padding types associated with one or more fields in the DCI message that depend on one or more of a value of the waveform selection field or a value of the SRS resource set indication field.

Some aspects described herein relate to a non-transitory computer-readable medium that stores a set of instructions for wireless communication by a network node. The set of instructions, when executed by one or more processors of the network node, may cause the network node to generate a DCI message that includes a waveform selection field that indicates a waveform type associated with a PUSCH transmission, and an SRS resource set indication field that indicates an mTRP transmission mode or an sTRP transmission mode associated with the PUSCH transmission. The set of instructions, when executed by one or more processors of the network node, may cause the network node to transmit the DCI message to a UE, wherein one or more fields in the DCI message are associated with one or more zero padding types based on one or more of a value of the waveform selection field or a value of the SRS resource set indication field.

Some aspects described herein relate to an apparatus for wireless communication. The apparatus may include means for receiving, from a network node, a DCI message that schedules a PUSCH transmission, wherein the DCI message includes a waveform selection field that indicates a waveform type associated with the PUSCH transmission, and an SRS resource set indication field that indicates an mTRP transmission mode or an sTRP transmission mode associated with the PUSCH transmission. The apparatus may include means for decoding the DCI message based on one or more zero padding types associated with one or more fields in the DCI message that depend on one or more of a value of the waveform selection field or a value of the SRS resource set indication field.

Some aspects described herein relate to an apparatus for wireless communication. The apparatus may include means for generating a DCI message that includes a waveform selection field that indicates a waveform type associated with a PUSCH transmission, and an SRS resource set indication field that indicates an mTRP transmission mode or an sTRP transmission mode associated with the PUSCH transmission. The apparatus may include means for transmitting the DCI message to a UE, wherein one or more fields in the DCI message are associated with one or more zero padding types based on one or more of a value of the waveform selection field or a value of the SRS resource set indication field.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features May include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
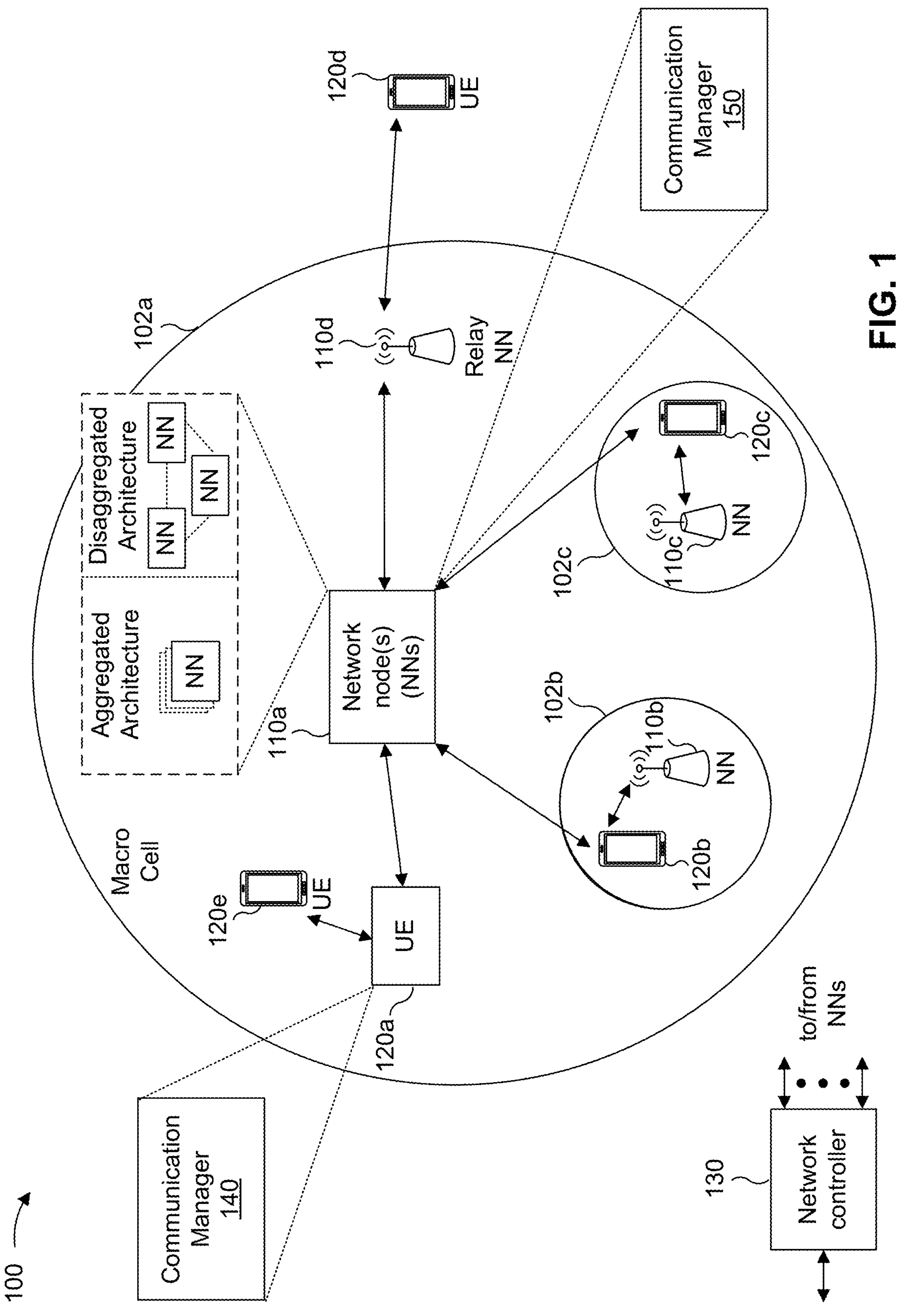
FIG. 1 is a diagram illustrating an example of a wireless network, in accordance with the present disclosure.

In a wireless network, such as a New Radio (NR) or Long Term Evolution (LTE) network, a network node may use downlink control information (DCI) to send dynamic physical layer control messages (e.g., physical downlink control channel (PDCCH) messages) to each UE. For example, the DCI messages that are sent by the network node may include system-wide control messages, group-specific control messages, or user equipment (UE)-specific messages, and the control information carried in the DCI messages may relate to downlink scheduling, uplink scheduling, sidelink scheduling, hybrid automatic repeat request (HARQ) management, and/or power control, among other examples. The DCI messages that are sent from a network node to a UE may be associated with a specific DCI format, with each serving a different usage, such as DCI format 0_0, 0_1, or 0_2 to schedule one or more physical uplink shared channel (PUSCH) transmissions, DCI format 1_0, 1_1, or 1_2 to schedule one or more physical downlink shared channel (PDSCH) transmissions, or the like.

In general, each DCI format specifies an order set of DCI fields, with each DCI field including one or more bits to convey distinct information (e.g., a frequency resource assignment, a time resource assignment, a redundancy version, a modulation and coding scheme (MCS), or the like). The number of bits associated with a DCI field may be fixed, or the number of bits associated with a DCI field may depend on a value of another DCI field. All of the DCI fields map, in an order associated with the corresponding DCI format, onto a set of information bits that the network node encodes and transmits on a PDCCH. The mapping is performed such that a most significant bit in each DCI field is mapped to a lowest-order information bit for the corresponding DCI field. Accordingly, in some cases, padding of one or more zero bits and/or truncation of one or more bits may be applied to align the payload sizes of different DCI formats. For example, the DCI size alignment simplifies a blind decoding process that a UE has to perform for a received DCI message and reduces the number of unique payload sizes that have to be searched for by a UE. However, DCI size alignment may be complex in cases where a DCI format includes one or more DCI fields that have a size that depends on the value of multiple other DCI fields and/or a size that depends on a combination of parameters (e.g., a value of a DCI field and a radio network temporary identifier (RNTI) used to scramble a cyclic redundancy check (CRC) of the DCI message).

In some aspects, as described herein, a network node may transmit a DCI message to a UE to schedule a PUSCH transmission by the UE, and the DCI message may include a waveform selection field to indicate whether the PUSCH transmission is associated with a cyclic prefix orthogonal frequency division multiplexing (CP-OFDM) waveform or a discrete Fourier transform spread OFDM (DFT-s-OFDM) waveform, and a sounding reference signal (SRS) resource set indicator field to indicate whether the PUSCH transmission is to be performed in a single transmission reception point (sTRP) mode or a multiple TRP (mTRP) mode, such as a spatial division multiplexing (SDM) mode or a single frequency network (SFN) mode. In such cases, the DCI message scheduling the PUSCH transmission may include one or more DCI fields that have a size (e.g., a number of bits) that depends on the values of the waveform selection field and the SRS resource indicator field. Additionally, or alternatively, the DCI message may include an SRS resource set indicator field to indicate whether the PUSCH transmission is to be performed in the sTRP mode or an mTRP mode (e.g., using an SDM or SFN transmission scheme) and a CRC that can be scrambled by a cell RNTI (C-RNTI) or a configured scheduling RNTI (CS-RNTI), in which case the DCI message may similarly include one or more DCI fields with a bit width (or size) that depends on a value of the SRS resource set indicator field and the RNTI used to scramble the CRC of the DCI message. For example, in some aspects, a wireless network may support one or more zero padding types, such as a per DCI field alignment type in which each DCI field with a variable bit width or size may include one or more zeros padded to the DCI field that has a smaller number of bits or bid width and/or a per DCI format field that includes one or more zeros padded at the end of the DCI message with the smaller bit width or DCI size until the DCI message with a smallest possible size has the same size as the DCI message with the largest possible size.

Accordingly, some aspects described herein relate to techniques that may be used to align a size of the DCI message used to schedule the PUSCH in cases where the DCI message includes one or more fields that depend on the values of multiple other fields (e.g., the waveform selection field and the SRS resource set indicator field) and/or another field (e.g., the SRS resource set indicator field) and the RNTI used to scramble the CRC of the DCI message, depending on whether the same or different zero padding types are used for the different DCI features that impact the sizes of other DCI fields. In this way, some aspects described herein may ensure that the DCI message scheduling the PUSCH has the same size regardless of the values of the multiple DCI fields and/or DCI features that potentially impact the DCI size, which simplifies the blind decoding process that a UE has to perform for a DCI message that schedules a PUSCH transmission, reduces the number of unique payload sizes that have to be searched for by the UE, and/or otherwise allows the UE to decode the DCI message.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., LTE) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an cNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device.

In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (cMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node 110, a DCI message that schedules a PUSCH transmission, wherein the DCI message includes: a waveform selection field that indicates a waveform type associated with the PUSCH transmission, and an SRS resource set indication field that indicates an mTRP transmission mode or an sTRP transmission mode associated with the PUSCH transmission; and decode the DCI message based on one or more zero padding types associated with one or more fields in the DCI message that depend on one or more of a value of the waveform selection field or a value of the SRS resource set indication field. Additionally, or alternatively, the communication manager 140 may perform one or more other operations described herein.

In some aspects, the network node 110 may include a communication manager 150. As described in more detail elsewhere herein, the communication manager 150 may generate a DCI message that includes: a waveform selection field that indicates a waveform type associated with a PUSCH transmission, and an SRS resource set indication field that indicates an mTRP transmission mode or an sTRP transmission mode associated with the PUSCH transmission; and transmit the DCI message to a UE 120, wherein one or more fields in the DCI message are associated with one or more zero padding types based on one or more of a value of the waveform selection field or a value of the SRS resource set indication field. Additionally, or alternatively, the communication manager 150 may perform one or more other operations described herein.

As indicated above, FIG. 1 is provided as an example. Other examples may differ from what is described with regard to FIG. 1.

Figure 2:
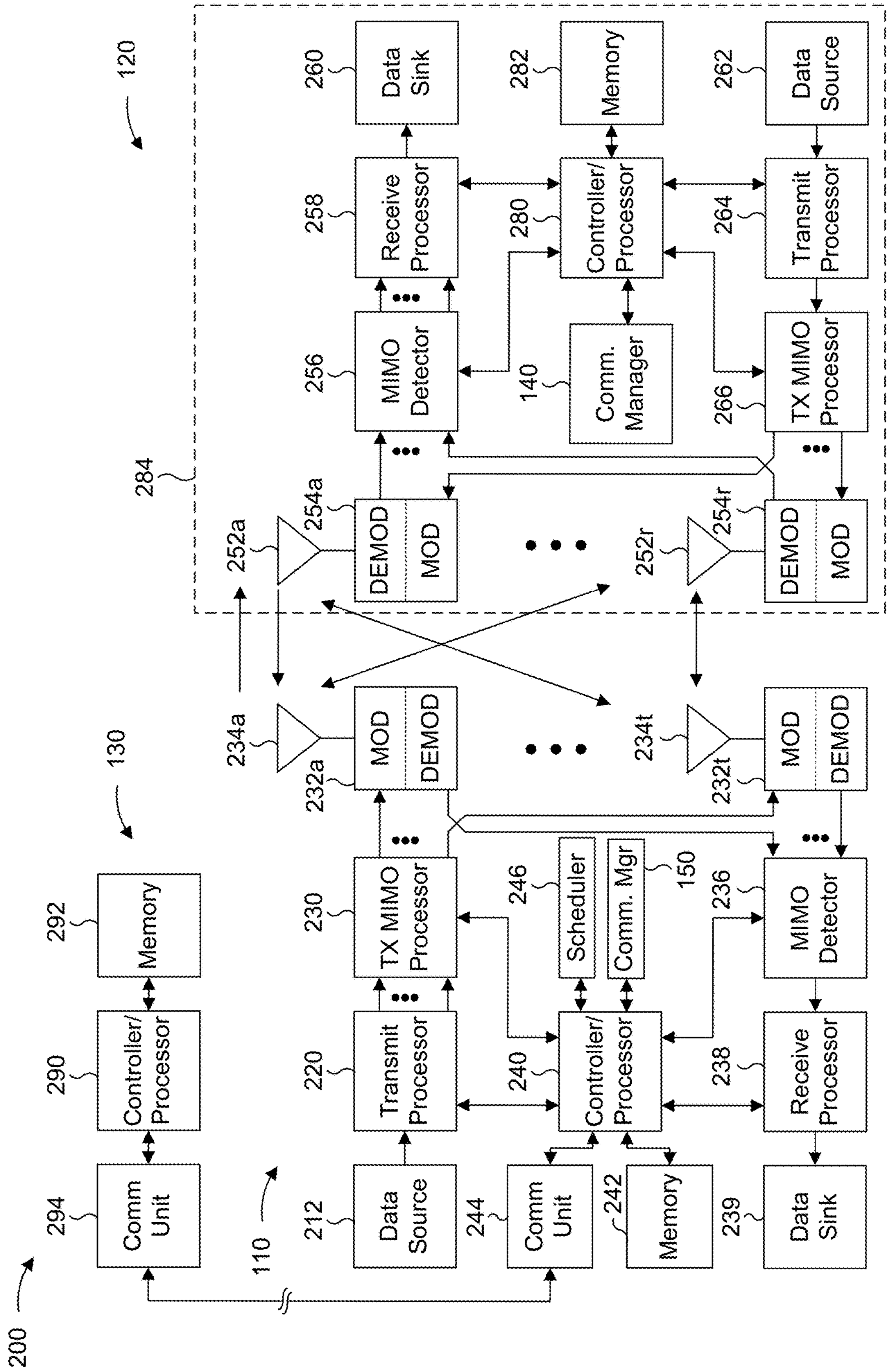
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more MCSs for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-12).

The controller/processor 240 of the network node 110, the controller/processor 280 of the UE 120, and/or any other component(s) of FIG. 2 may perform one or more techniques associated with DCI alignment for scheduling uplink transmission, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving, from a network node 110, a DCI message that schedules a PUSCH transmission, wherein the DCI message includes: a waveform selection field that indicates a waveform type associated with the PUSCH transmission, and an SRS resource set indication field that indicates an mTRP transmission mode or an sTRP transmission mode associated with the PUSCH transmission; and/or means for decoding the DCI message based on one or more zero padding types associated with one or more fields in the DCI message that depend on one or more of a value of the waveform selection field or a value of the SRS resource set indication field. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for generating a DCI message that includes: a waveform selection field that indicates a waveform type associated with a PUSCH transmission, and an SRS resource set indication field that indicates an mTRP transmission mode or an sTRP transmission mode associated with the PUSCH transmission; and/or means for transmitting the DCI message to a UE 120, wherein one or more fields in the DCI message are associated with one or more zero padding types based on one or more of a value of the waveform selection field or a value of the SRS resource set indication field. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. “Network entity” or “network node” may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
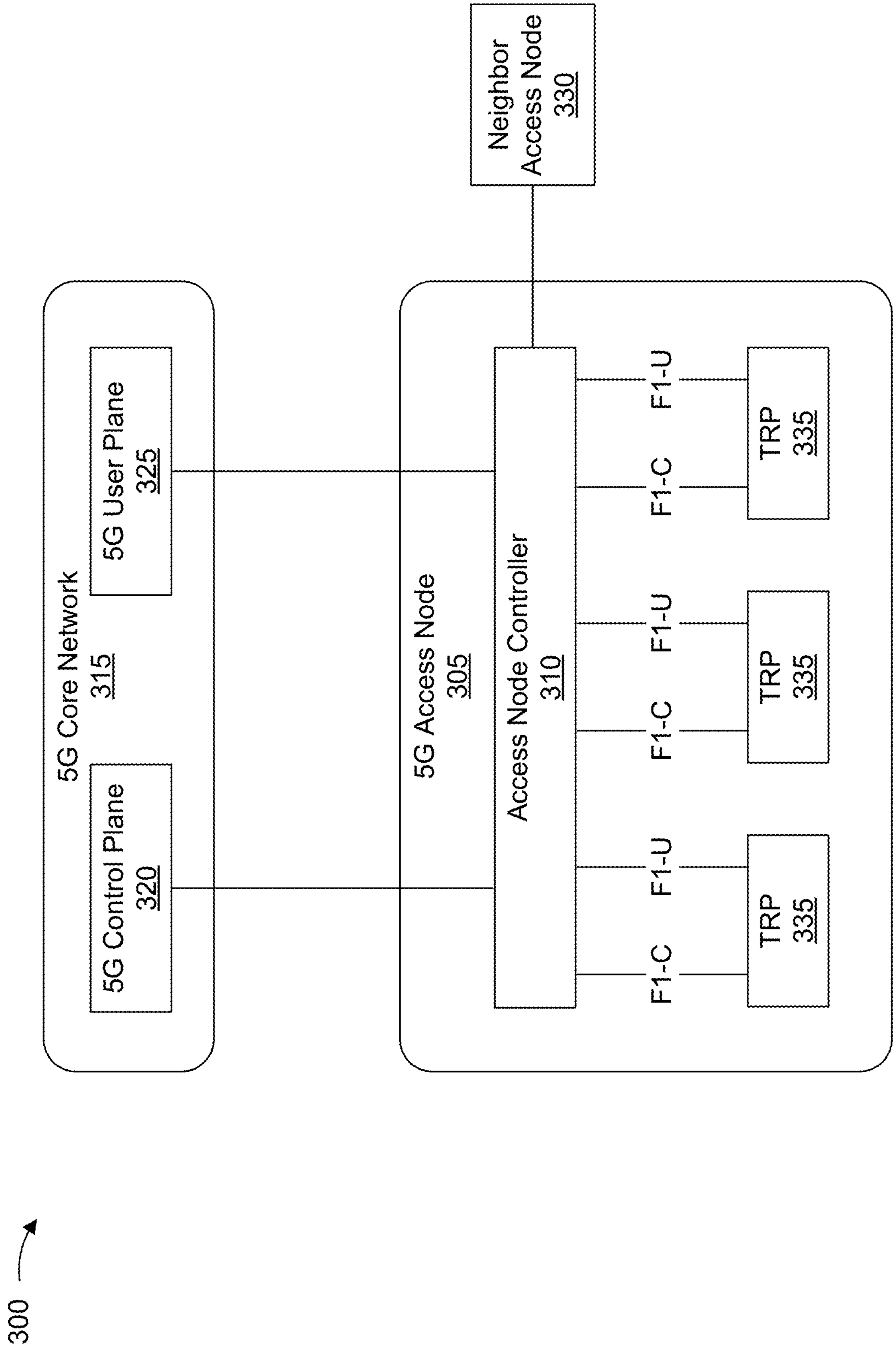
FIG. 3 illustrates an example logical architecture of a distributed radio access network (RAN), in accordance with the present disclosure.

FIG. 3 illustrates an example logical architecture of a distributed RAN 300, in accordance with the present disclosure.

A 5G access node 305 may include an access node controller 310. The access node controller 310 may be a CU of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305 and/or an LTE access node) may terminate at the access node controller 310.

The access node controller 310 may include and/or may communicate with one or more TRPs 335 (e.g., via an F1 Control (F1-C) interface and/or an F1 User (F1-U) interface). A TRP 335 may include a DU and/or an RU of the distributed RAN 300. In some aspects, a TRP 335 may correspond to a network node 110 described above in connection with FIG. 1. For example, different TRPs 335 may be included in different network nodes 110. Additionally, or alternatively, multiple TRPs 335 may be included in a single network node 110. In some aspects, a network node 110 may include a CU (e.g., access node controller 310) and/or one or more DUs (e.g., one or more TRPs 335). In some cases, a TRP 335 may be referred to as a cell, a panel, an antenna array, or an array.

A TRP 335 may be connected to a single access node controller 310 or to multiple access node controllers 310. In some aspects, a dynamic configuration of split logical functions may be present within the architecture of distributed RAN 300, referred to elsewhere herein as a functional split. For example, a packet data convergence protocol (PDCP) layer, a radio link control (RLC) layer, and/or a medium access control (MAC) layer may be configured to terminate at the access node controller 310 or at a TRP 335.

In some aspects, multiple TRPs 335 may transmit downlink communications and/or receive uplink communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters, among other examples). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120 and/or receive traffic from a UE 120.

As indicated above, FIG. 3 is provided as an example. Other examples may differ from what was described with regard to FIG. 3.

Figure 4:
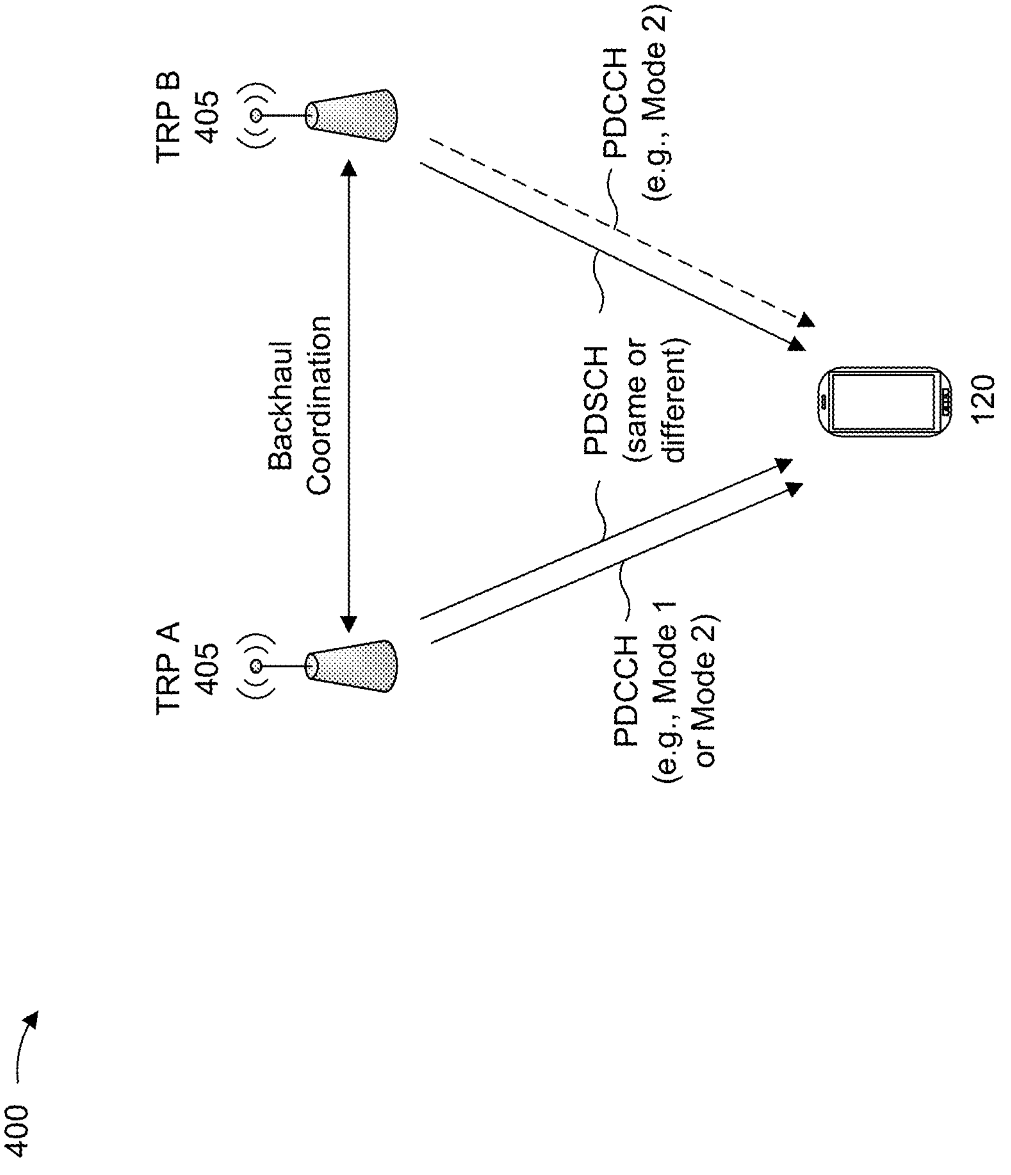
FIG. 4 is a diagram illustrating an example of multiple transmission reception point (mTRP) communication, in accordance with the present disclosure.

FIG. 4 is a diagram illustrating an example 400 of mTRP communication (sometimes referred to as multi-panel communication), in accordance with the present disclosure. As shown in FIG. 4, multiple TRPs 405 may communicate with the same UE 120. A TRP 405 may correspond to a TRP 335 described above in connection with FIG. 3.

The multiple TRPs 405 (shown as TRP A and TRP B) may communicate with the same UE 120 in a coordinated manner (e.g., using coordinated multipoint transmissions) to improve reliability and/or increase throughput. The TRPs 405 may coordinate such communications via an interface between the TRPs 405 (e.g., a backhaul interface and/or an access node controller 310). The interface may have a smaller delay and/or higher capacity when the TRPs 405 are co-located at the same network node 110 (e.g., when the TRPs 405 are different antenna arrays or panels of the same network node 110), and may have a larger delay and/or lower capacity (as compared to co-location) when the TRPs 405 are located at different network nodes 110. The different TRPs 405 may communicate with the UE 120 using different QCL relationships (e.g., different TCI states), different DMRS ports, and/or different layers (e.g., of a multi-layer communication).

In a first mTRP transmission mode (e.g., Mode 1), a single PDCCH may be used to schedule downlink data communications for a single PDSCH. In this case, multiple TRPs 405

(e.g., TRP A and TRP B) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in DCI (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for sTRP transmission) or multiple TCI states (for mTRP transmission as discussed here) in this mTRP transmission mode (e.g., Mode 1).

In a second mTRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0 or DCI format 1_1) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 4 is provided as an example. Other examples may differ from what is described with respect to FIG. 4.

Figure 5A:
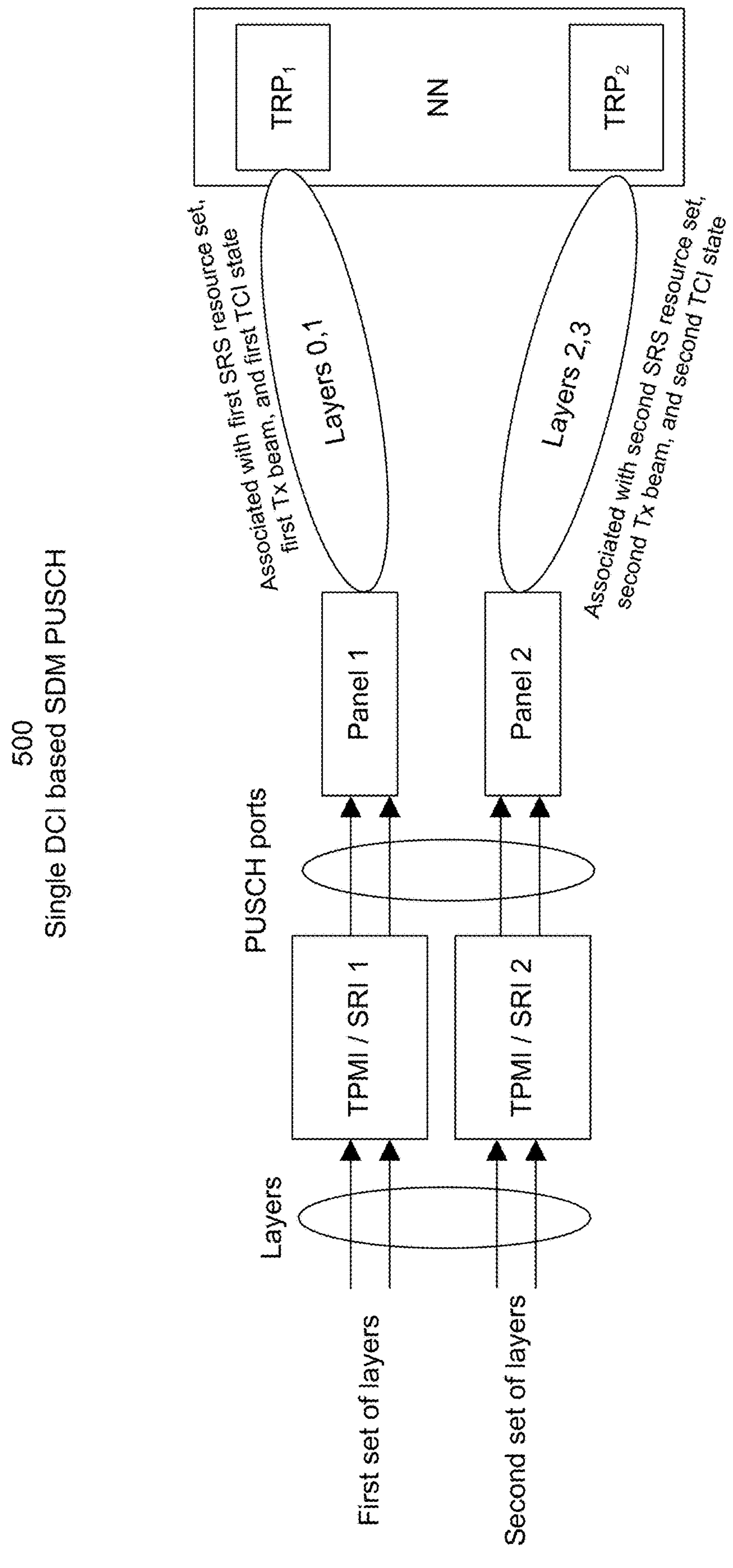
FIGS. 5A-5B are diagrams illustrating examples of mTRP uplink communication, in accordance with the present disclosure.
Figure 5B:
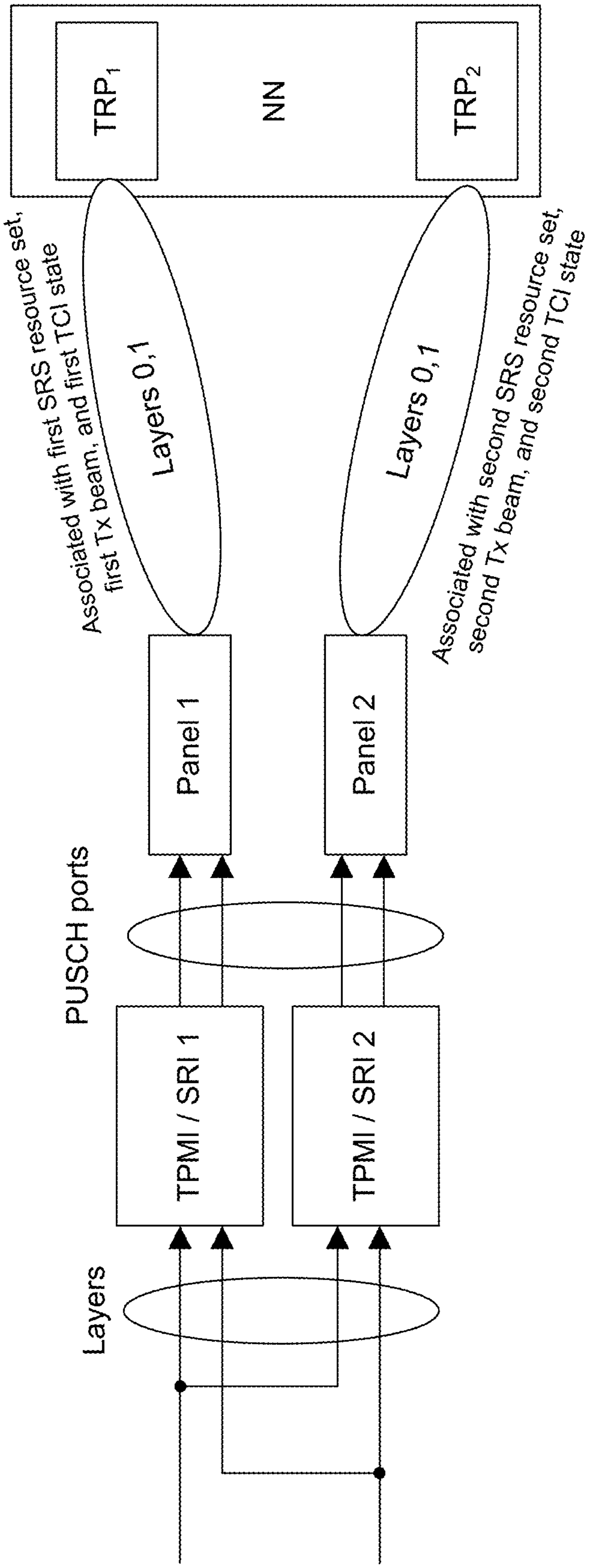

FIGS. 5A-5B are diagrams illustrating examples 500, 550 of mTRP uplink communication, in accordance with the present disclosure. For example, as described in further detail herein, example 500 in FIG. 5A depicts an SDM PUSCH transmission scheme based on a single DCI message, and example 550 in FIG. 5B depicts an SFN PUSCH transmission scheme based on a single DCI message.

For example, referring to FIG. 5A, the SDM PUSCH transmission scheme is an mTRP uplink transmission scheme that may be supported in a wireless network to enable simultaneous transmission with multiple panels (STxMP) by a UE. For example, a network node (e.g., a DU or CU) associated with multiple TRPs (e.g., shown as $TRP_1$ and $TRP_2$ in FIG. 5A, which correspond to different RUs associated with a DU or different DUs associated with a CU) may transmit a single DCI message to the UE, where the single DCI message may schedule a PUSCH transmission that includes two sets of DMRS ports and/or layers that are transmitted from two different panels using different transmit beams, precoders, and/or power control parameters. In some aspects, because the SDM PUSCH transmission scheme shown in FIG. 5A is an mTRP transmission scheme in which a single DCI schedules the PUSCH transmission in the SDM transmission mode, the various TRPs associated with the network node may be associated with an ideal backhaul that connects the multiple TRPs and allows for information to be exchanged between the multiple TRPs.

For example, in FIG. 5A, example 500 illustrates an SDM PUSCH transmission that includes a four layer transmission, including a first set of layers that includes two layers (e.g., layers 0 and 1) that are transmitted toward a first TRP (e.g., $TRP_1$) through a first set of PUSCH ports associated with a first panel using a first transmit precoder matrix indicator (TPMI) and/or a first SRS resource indicator (SRI), and a second set of layers that includes two layers (e.g., layers 2 and 3) that are transmitted toward a second TRP (e.g., $TRP_2$) through a second set of PUSCH ports associated with a second panel using a second TPMI and/or a second SRI. Accordingly, the first set of layers and the second set of layers are each associated with an SRS resource set, and the DCI message that schedules the PUSCH transmission can include an SRS resource set indicator field and two SRI or TPMI fields. For example, as shown, the first set of layers transmitted toward the first TRP may be associated with a first transmit beam and/or a first TCI state (or spatial relation), and the second set of layers transmitted toward the second TRP may be associated with a second transmit beam and/or a second TCI state (or spatial relation).

In some aspects, as described herein, the single DCI message that schedules the PUSCH transmission in the SDM PUSCH mode can include an SRS resource set indicator field and two SRI or TPMI fields. However, in some cases, the network node may schedule the PUSCH transmission in an sTRP mode (e.g., where one or more TRPs are congested or associated with poor channel conditions, among other examples). Accordingly, the SRS resource set indicator field in the DCI message used to schedule the PUSCH transmission may be used to switch between the SDM (mTRP) transmission scheme and an sTRP transmission scheme. For example, the SRS resource set indicator field may include two bits, which may have a first value (e.g., "00") to indicate that the scheduled PUSCH is only associated with a first SRS resource set in an sTRP mode, a second value (e.g., "01") to indicate that the scheduled PUSCH is only associated with a second SRS resource set in an sTRP mode, or a third value (e.g., "10") to indicate that the scheduled PUSCH is associated with the first SRS resource set and the second SRS resource set in the SDM mTRP mode. Furthermore, in cases where the PUSCH is associated with the SDM transmission scheme, the DCI message may indicate a rank combination, which may have four possibilities (e.g., one layer in each set of layers, two layers in each set of layers, one layer in the first set of layers and two layers in the second set of layers, or two layers in the first set of layers and one layer in the second set of layers).

Additionally, or alternatively, referring to FIG. 5B, the SFN PUSCH transmission scheme is another mTRP uplink transmission scheme that may be supported in a wireless network to enable STxMP by a UE. For example, in the SFN PUSCH transmission scheme, a network node associated with multiple TRPs may transmit a single DCI message to the UE, where the single DCI message may schedule an SFN PUSCH transmission in which each DMRS port or layer of the PUSCH is transmitted from two panels using different transmit beams, precoders, and/or power control parameters (e.g., the same information is transmitted using different panels, transmit beams, and/or TCI states). For example, in FIG. 5B, example 550 illustrates an SFN PUSCH transmission that includes a two layer transmission, including a first layer (e.g., layer 0) that is transmitted toward a first TRP (e.g., $TRP_1$) through a first set of PUSCH ports associated with a first panel using a first TPMI and/or a first SRI, and a second layer (e.g., layer 1) that is transmitted toward the first TRP through the first set of PUSCH ports associated with the first panel using the first TPMI and/or the first SRI. Furthermore, as shown, the first layer is transmitted toward a second TRP (e.g., $TRP_1$) through a second set of PUSCH ports associated with a second panel using a second TPMI and/or a second SRI, and the second layer is transmitted toward the second TRP through the second set of PUSCH ports associated with the second panel using the second TPMI and/or the second SRI. Accordingly, in the SFN transmission scheme, each DMRS port or layer of the PUSCH is associated with two SRS resource sets, and the DCI message that schedules the PUSCH transmission can include an SRS resource set indicator field and two SRI or TPMI fields, which can be used to dynamically switch between the SFN PUSCH mode and an sTRP mode. For example, the SRS resource set indicator field may include two bits, which may have a first value (e.g., "00") to indicate that the scheduled PUSCH is only associated with a first SRS resource set in an sTRP mode, a second value (e.g., "01") to indicate that the scheduled PUSCH is only associated with a second SRS resource set in an sTRP mode, or a third value (e.g., "10") to indicate that the scheduled PUSCH is associated with the first SRS resource set and the second SRS resource set in the SFN mTRP mode.

Accordingly, in both the SDM transmission scheme and the SFN transmission scheme, dynamic switching between the mTRP transmission scheme (e.g., SDM or SFN) and sTRP transmission schemes may be indicated by the SRS resource set indicator field of the DCI. For example, in cases where the SRS resource set indicator field has a value (e.g., "00" or "01") that indicates one SRS resource set, corresponding to an sTRP transmission scheme, the DCI message that schedules the PUSCH transmission may need one SRI or TPMI indication (e.g., for a codebook-based PUSCH), which may require a first number of bits in the DCI message to provide the one SRI or TPMI indication. Alternatively, in cases where the SRS resource set indicator field has a value (e.g., "10") that indicates two SRS resource sets, corresponding to the SDM or SFN transmission scheme, the DCI message that schedules the PUSCH transmission may need two SRI indications or two TPMI indications (e.g., for a codebook-based PUSCH), which may require a second number of bits in the DCI message to provide the two SRI or TPMI indications.

Furthermore, in addition to the SRI or TPMI indication(s), the DCI message may include a phase tracking reference signal (PTRS)-DMRS association field and/or other fields that may have a size that depends on whether the PUSCH is scheduled in the sTRP mode or the mTRP (e.g., SDM or SFN) mode. In this context, it should be noted that the DCI message is not used to dynamically switch between the SDM mode and the SFN mode, as the network node only configures one mode or the other using radio resource control (RRC) signaling. In any case, because the DCI message includes the SRI/TPMI field and/or one or more other fields that depend on whether the PUSCH transmission is scheduled in the sTRP mode or the RRC-configured mTRP mode, the sizes and interpretations of the various fields in the DCI message may differ depending on the value of the SRS resource set indication field. Accordingly, as described herein, one or more zero padding types may be applied to the DCI field(s) that depend on the value of the SRS resource set indication field and/or the DCI message in order to ensure that the DCI message has a fixed size that enables appropriate decoding by the UE (e.g., because the UE does not know whether the DCI message is scheduling a PUSCH transmission in the sTRP mode or the RRC-configured mTRP mode until the DCI message is decoded and the UE has read the SRS resource set indicator field).

Furthermore, in addition to the SRI or TPMI indication(s) and/or other fields (e.g., the PTRS-DMRS association field) having a bit width that depends on the value of the SRS resource set indicator field, the network node may support dynamic waveform switching (DWS) to switch between different waveforms for the PUSCH. For example, in cases where DWS is supported, a DCI message scheduling a PUSCH transmission may include a waveform selection field, which may include one bit that has a first value to indicate that the PUSCH is associated with a CP-OFDM waveform (e.g., with transform precoding disabled) or a second value to indicate that the PUSCH is associated with a DFT-s-OFDM waveform (e.g., with transform precoding enabled). Furthermore, in cases where the DCI message includes the waveform selection field, the DCI message may include one or more other DCI fields that depend on the selected waveform (e.g., in terms of the bit width or number of bits and an interpretation). For example, the DCI message may include a first DCI field that indicates precoding information and a number of layers, a second field that indicates antenna ports, a third field that indicates a PTRS-DMRS association, a fourth field that indicates a DMRS sequence initialization, and/or other fields that have a size and/or an interpretation that may differ depending on whether the PUSCH is associated with a CP-OFDM waveform or a DFT-s-OFDM waveform. Accordingly, as described herein, one or more zero padding types may be applied to the DCI field(s) that depend on the value of the waveform selection field and/or the DCI message in order to ensure that the DCI message has a fixed size that enables appropriate decoding by the UE (e.g., because the UE does not know whether the DCI message is scheduling a PUSCH transmission using the CP-OFDM waveform or the DFT-s-OFDM waveform until the DCI message is decoded and the UE has read the waveform selection field).

As described herein, when zero padding is applied to a DCI message to align the size of the DCI message and enable decoding by the UE, the zero padding may be associated with a first zero padding type, sometimes referred to as a per DCI field alignment or a "Type 1" zero padding, or the zero padding may be associated with a second zero padding type, sometimes referred to as a per DCI format alignment or a "Type 2" zero padding. For example, in the first zero padding type, each DCI field that has a size or bit width that depends on the size of another DCI field or feature of the DCI message may include one or more zeros that are padded within the DCI field that has the smaller bit width or number of bits for the corresponding DCI field. Alternatively, in the second zero padding type, where a DCI message has a first size when indicating a first possible configuration or a second size when indicating a second possible configuration, the DCI message indicating the possible configuration with the smaller size may include one or more zeros appended to the DCI message until the DCI message indicating the first possible configuration and the DCI message indicating the second possible configuration have the same size.

For example, assuming that "field A" in a DCI message can indicate either a first configuration or a second configuration, and that fields $B_1$ to $B_N$ each have a size that depends on whether field A indicates the first configuration or the second configuration, the fields $B_1$ to $B_N$ may have sizes $x_1$ to $x_N$ if the first configuration is indicated, or sizes $y_1$ to $y_N$ if the second configuration is indicated. Furthermore, the DCI message may include one or more fields, $C_1$ to $C_N$, that have a fixed size regardless of whether the DCI message indicates the first configuration or the second configuration. In such cases, the fields $C_1$ to $C_N$ may have a total size z, which does not change regardless of whether the DCI message indicates the first configuration or the second configuration. In this example, if the first zero padding type (per DCI field alignment) is used, the total size of the DCI message may correspond to the size of field A plus the maximum of ($x_i$, $y_i$) for each field $B_i$ that has a size that depends on the value of field A, plus the total size z of the fields $C_1$ to $C_N$ that do not depend on the value of field A. Alternatively, if the second zero padding type (per DCI format alignment) is used, the total size of the DCI message may correspond to a maximum of a first value equal to the sum of the size of field A, the size of each field $B_i$ if field A indicates the first configuration, and the total size z of the fields $C_1$ to $C_N$ that do not depend on the value of field A, or a second value equal to the sum of the size of field A, the size of each field $B_i$ if field A indicates the second configuration, and the total size z of the fields $C_1$ to $C_N$ that do not depend on the value of field A.

Accordingly, in some cases, the second zero padding type (per DCI format alignment) can result in a smaller DCI size and may be more efficient than the first zero padding type (per DCI field alignment) (e.g., in cases where a first DCI field has a larger size when the first configuration is indicated but a second DCI field has a larger size when the second configuration is indicated). However, the second zero padding type requires placing the DCI field that other DCI fields depend on prior to placing all of the other (dependent) DCI fields because the UE needs to read the DCI field that the other DCI fields depend on before knowing the size and interpretation of the other (dependent) DCI fields, and this condition is not needed for the first zero padding type. Furthermore, complications may arise in cases where the DCI message includes one or more fields that depend on a combination of other DCI fields, or a combination of DCI features. For example, when a UE is RRC-configured with DWS and an mTRP transmission scheme (e.g., either SDM or SFN), the DCI size alignment may depend on whether the first zero padding type or the second zero padding type is enabled for each of the two features. In addition, the DCI size alignment may be further complicated in cases where the mTRP mode is SDM, because the DFT-s-OFDM waveform is not applicable to the SDM scheme (e.g., because transmission in the SDM mode requires at least two layers, and multi-layer DFT-s-OFDM is currently unsupported). Furthermore, there may be cases where the DCI message is used to dynamically switch between the sTRP mode and an mTRP (e.g., SDM or SFN) mode and the first zero padding type is configured to be used to align a DCI size depending on the RNTI used to scramble the CRC of the DCI message. For example, in cases where the bit width of a field in a DCI message scheduling a PUSCH with a CRC scrambled by a CS-RNTI differs from the bit width of the same field when the CRC is scrambled by a C-RNTI, a number of most significant bits with a value of zero are generally inserted into the field of the DCI message with the CRC scrambled by the CS-RNTI until the bit width equals the bit width of the corresponding field if the CRC were scrambled by a C-RNTI.

Accordingly, some aspects described herein relate to techniques that may be used to align a size of a DCI message used to schedule the PUSCH in cases where the DCI message includes one or more fields that depend on the values of multiple other fields (e.g., the waveform selection field and the SRS resource set indicator field) and/or another field (e.g., the SRS resource set indicator field) and the RNTI used to scramble the CRC of the DCI message, depending on whether the same or different zero padding types are used for the different DCI features that impact the size of other DCI fields. In this way, some aspects described herein may ensure that the DCI message scheduling the PUSCH has the same size regardless of the values of the multiple DCI fields and/or DCI features that potentially impact the DCI size, which simplifies the blind decoding process that a UE has to perform for a DCI message that schedules a PUSCH transmission, reduces the number of unique payload sizes that have to be searched for by the UE, and/or otherwise allows the UE to decode the DCI message.

As indicated above, FIGS. 5A-5B are provided as examples. Other examples may differ from what is described with respect to FIGS. 5A-5B.

Figure 6:
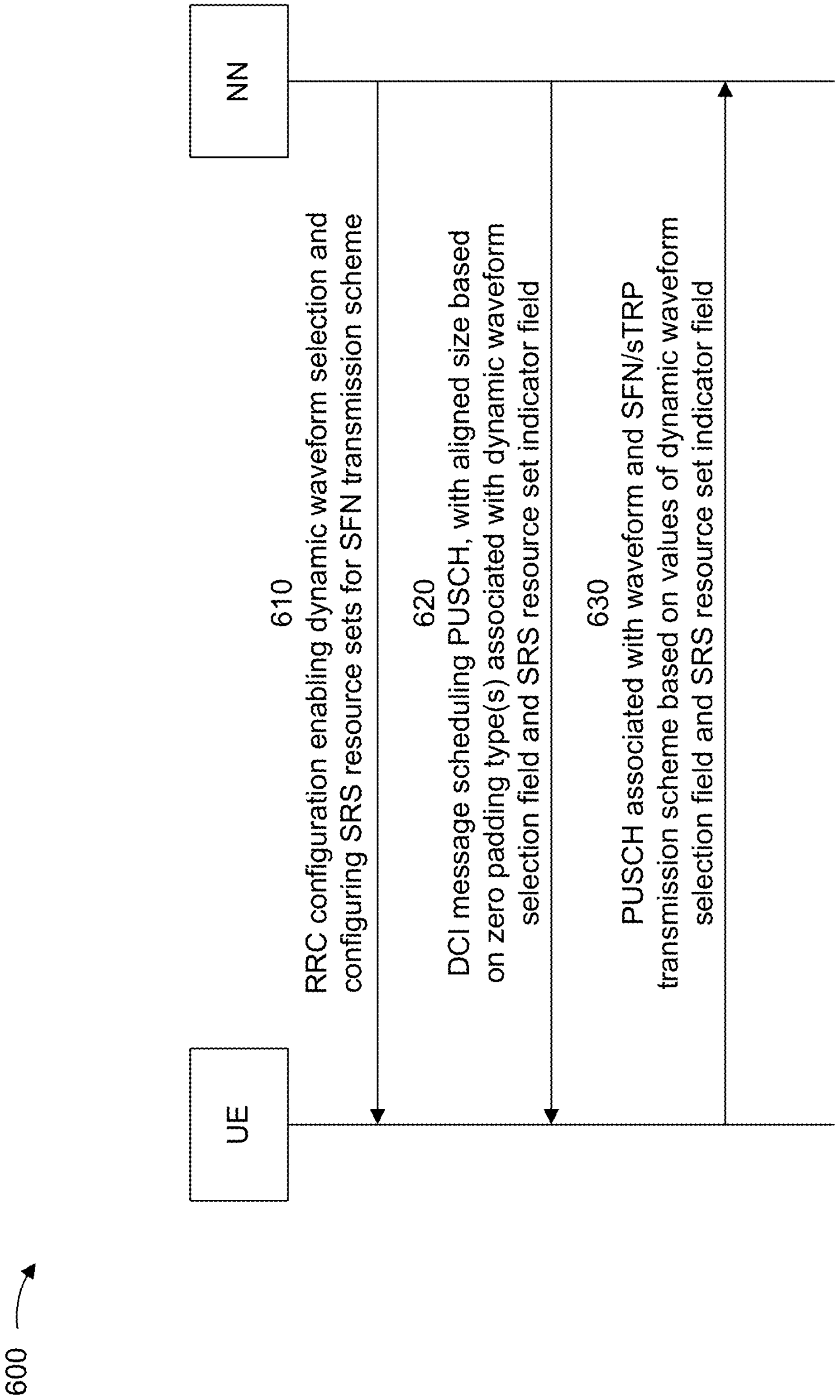
FIGS. 6-8 are diagrams illustrating examples associated with downlink control information (DCI) size alignment for scheduling uplink transmission, in accordance with the present disclosure.

FIG. 6 is a diagram illustrating an example 600 associated with DCI size alignment for scheduling uplink transmission, in accordance with the present disclosure. As shown in FIG. 6, example 600 includes communication between a network node (e.g., network node 110) and a UE (e.g., UE 120). In some aspects, the network node may include or may be associated with multiple TRPs that can be operated in an mTRP mode, such as an SFN mode, or in an sTRP mode. In some aspects, the network node and the UE may communicate in a wireless network, such as wireless network 100. The network node and the UE may communicate via a wireless access link, which may include an uplink and a downlink.

In some aspects, as shown in FIG. 6, and by reference number 610, the network node may transmit, and the UE may receive, an RRC configuration that enables DWS and configures SRS resource sets to enable mTRP uplink communication using an SFN transmission scheme. For example, when the RRC configuration enables DWS, one or more DCI messages that the network node transmits to the UE to schedule a PUSCH may include a waveform selection field that may have one bit to indicate whether the PUSCH is scheduled using the CP-OFDM waveform or the DFT-s-OFDM waveform. In addition, the RRC configuration to enable mTRP uplink communication using the SFN transmission scheme may indicate two SRS resource sets for codebook or non-codebook uplink transmission using the SFN transmission scheme. In such cases, the DCI message that the network node transmits to the UE to schedule a PUSCH may include an SRS resource set indicator field, which has two bits to indicate whether the PUSCH is configured to be performed in an sTRP transmission mode (e.g., when a codepoint indicated by the SRS resource set indicator field is "00" or "01") or using the SFN transmission scheme (e.g., when the codepoint indicated by the SRS resource set indicator field is "10").

Accordingly, when the RRC configuration enables DWS and configures SRS resource sets to enable mTRP uplink communication using the SFN transmission scheme, a DCI message scheduling a PUSCH may include a waveform selection field and an SRS resource set indicator field, which may collectively indicate four possible configurations. For example, in some aspects, the DCI message may indicate that the PUSCH scheduled by the DCI message is associated with the CP-OFDM waveform and the sTRP transmission mode, the DFT-s-OFDM waveform and the sTRP transmission mode, the CP-OFDM waveform and the SFN transmission scheme, or the DFT-s-OFDM waveform and the SFN transmission mode. Furthermore, as described herein, the DCI message may include one or more other fields that have a size and/or an interpretation that depends on which of the four possible configurations the DCI message indicates for the waveform and the transmission mode of the PUSCH.

As further shown in FIG. 6, and by reference number 620, the network node may transmit, and the UE may receive, a DCI message that schedules a PUSCH transmission, where the DCI message includes a waveform selection field that indicates whether the PUSCH transmission is to be performed using the CP-OFDM or DFT-s-OFDM waveform and an SRS resource set indicator field that indicates whether the PUSCH transmission is to be performed in the sTRP or SFN transmission mode. Accordingly, because there may be one or more other fields that have a size and/or an interpretation that depends on which of the four possible configurations the DCI message indicates for the waveform and the transmission mode of the PUSCH, the network node may apply one or more zero padding types to align the size of the DCI message, regardless of which configuration is indicated in the DCI message.

For example, in some aspects, a first zero padding type (e.g., a per DCI field alignment, or Type 1 zero padding) may be used for both the waveform selection field and the SRS resource set indicator field. In such cases, if a DCI field in the DCI message has a size that depends on a value of the waveform selection field and also depends on a value of the SRS resource set indicator field, the network node may determine a maximum size for the DCI field among the four possible configurations, and may pad zeros to the DCI field for the other three configurations until the size of the DCI field equals the maximum size among the four possible configurations.

Alternatively, in some aspects, a second zero padding type (e.g., a per DCI format alignment, or Type 2 zero padding) may be used for both the waveform selection field and the SRS resource set indicator field. In such cases, the network node may determine a maximum size for the DCI field among the four possible configurations, and may pad zeros to the end of the DCI message for the other three configurations until the size of the DCI message equals the maximum possible size.

Alternatively, in some aspects, the first zero padding type (e.g., a per DCI field alignment, or Type 1 zero padding) may be used for the waveform selection field, and the second zero padding type (e.g., a per DCI format alignment, or Type 2 zero padding) may be used for the SRS resource set indicator field (e.g., for switching between the sTRP and SFN transmission schemes). In such cases, among the two possibilities for the waveform selection field (e.g., CP-OFDM or DFT-s-OFDM), given a first possible value of the SRS resource set indicator field (e.g., sTRP), the network node may apply the first zero padding type, or per DCI field alignment, to each DCI field that is a function of the indicated waveform, which may result in a first possible size for the DCI message. The network node may then determine, among the two possibilities for the waveform selection field (e.g., CP-OFDM or DFT-s-OFDM), given a second possible value of the SRS resource set indicator field (e.g., SFN), the network node may apply the first zero padding type, or per DCI field alignment, to each DCI field that is a function of the indicated waveform, which may result in a second possible size for the DCI message. Among the first possible size and the second possible size for the DCI message, the network node may then pad zeros at the end of the DCI message with the smaller size until the DCI size is the same as the DCI message with the larger size (e.g., the size of the transmitted DCI message is the larger of the two possible sizes for the DCI message).

Alternatively, in some aspects, the second zero padding type (e.g., a per DCI format alignment, or Type 2 zero padding) may be used for the waveform selection field, and the first zero padding type (e.g., a per DCI field alignment, or Type 1 zero padding) may be used for the SRS resource set indicator field (e.g., for switching between the sTRP and SFN transmission schemes). In such cases, among the two possibilities for the SRS resource set indicator field (e.g., sTRP or SFN) given a first possible value of the waveform selection field (e.g., CP-OFDM), the network node may apply the first zero padding type, or per DCI field alignment, to each DCI field that is a function of the indicated SRS resource sets, which may result in a first possible size for the DCI message. The network node may then, among the two possibilities for the SRS resource set indicator field (e.g., sTRP or SFN), given a second possible value of the waveform selection field (e.g., DFT-s-OFDM), apply the first zero padding type, or per DCI field alignment, to each DCI field that is a function of the indicated SRS resource sets, which may result in a second possible size for the DCI message. Among the first possible size and the second possible size for the DCI message, the network node may then pad zeros at the end of the DCI message with the smaller size until the DCI size is the same as the DCI message with the larger size (e.g., the size of the transmitted DCI message is the larger of the two possible sizes for the DCI message).

In some aspects, the zero padding type(s) used for the waveform selection field and the SRS resource set indicator field may be based on signaling that the UE transmits to the network node to indicate one or more capabilities of the UE. For example, in some aspects, the signaling transmitted from the UE to the network may indicate a capability of the UE to support DWS or dynamic switching between the sTRP and SFN transmission schemes by interpreting that the DCI message scheduling the PUSCH is constructed using a particular zero padding type (e.g., the first zero padding type or the second zero padding type). Additionally, or alternatively, the signaling transmitted from the UE to the network may indicate a capability of the UE to jointly support DWS and dynamic switching between the sTRP and SFN transmission schemes. Additionally, or alternatively, the signaling transmitted from the UE to the network may indicate a capability of the UE to jointly support DWS and dynamic switching between the sTRP and SFN transmission schemes based on the DCI message scheduling the PUSCH being constructed using a particular zero padding type for the waveform selection field and a particular zero padding type for dynamic switching between the sTRP and SFN transmission schemes.

As further shown in FIG. 6, and by reference number 630, the UE may transmit, and the network node may receive, a PUSCH transmission associated with the waveform and the sTRP/mTRP transmission mode indicated in the DCI message. For example, in some aspects, the UE may decode the DCI message based on the one or more zero padding types that are applied to the DCI message, which may ensure that the DCI message has the same size regardless of whether the PUSCH transmission is scheduled using the CP-OFDM waveform or the DFT-s-OFDM waveform, and regardless of whether the PUSCH transmission is scheduled in the sTRP or SFN mode. Furthermore, upon decoding the DCI message and reading the values of the waveform selection field and the SRS resource set indicator field, the UE may read and interpret the remaining fields in the DCI message to determine the appropriate parameters to be applied to the PUSCH transmission.

As indicated above, FIG. 6 is provided as an example. Other examples may differ from what is described with respect to FIG. 6.

Figure 7:
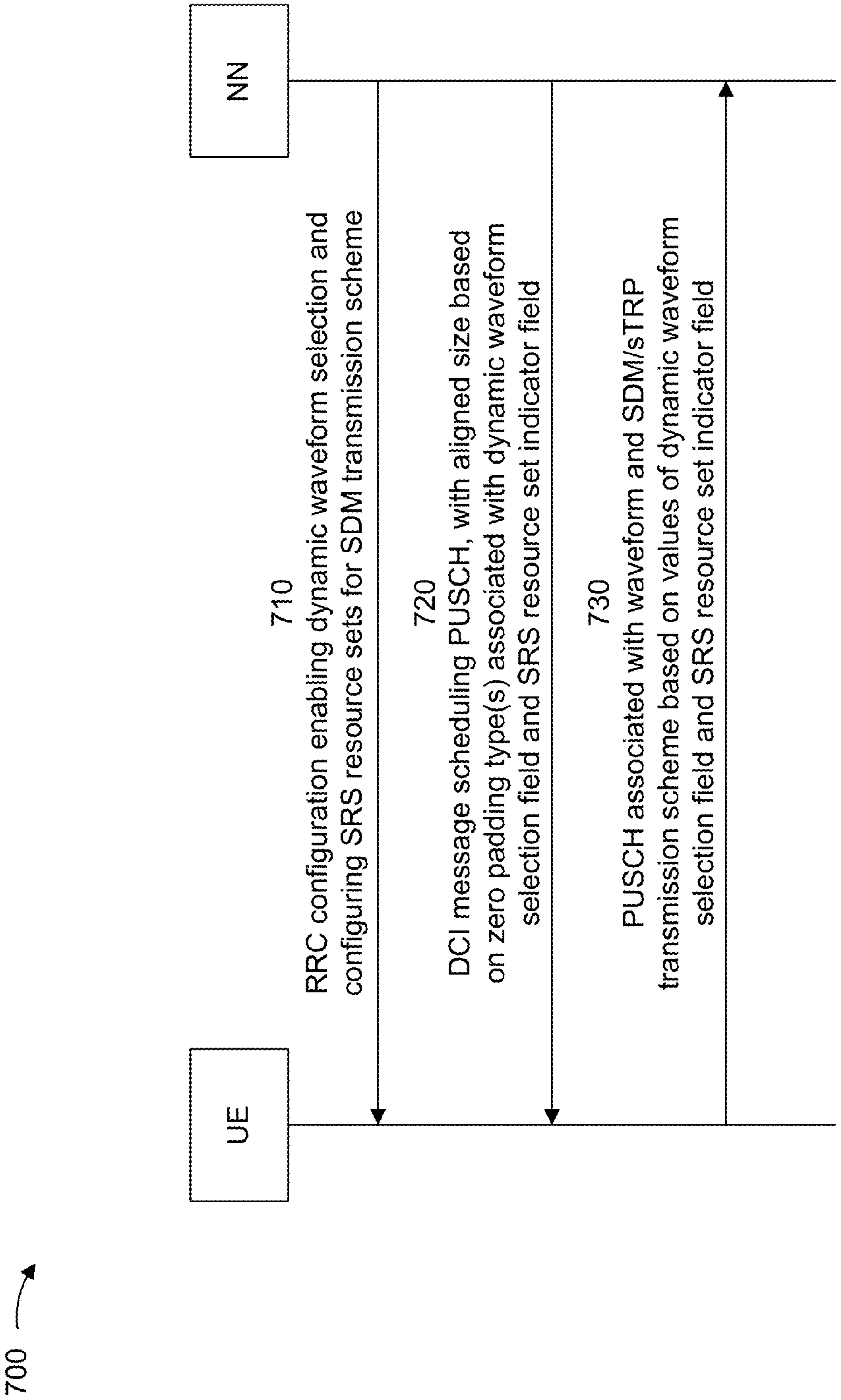

FIG. 7 is a diagram illustrating an example 700 associated with DCI size alignment for scheduling uplink transmission, in accordance with the present disclosure. As shown in FIG. 7, example 700 includes communication between a network node (e.g., network node 110) and a UE (e.g., UE 120). In some aspects, the network node may include or may be associated with multiple TRPs that can be operated in an mTRP mode, such as an SDM mode, or in an sTRP mode. In some aspects, the network node and the UE may communicate in a wireless network, such as wireless network 100. The network node and the UE may communicate via a wireless access link, which may include an uplink and a downlink.

In some aspects, as shown in FIG. 7, and by reference number 710, the network node may transmit, and the UE may receive, an RRC configuration that enables DWS and configures SRS resource sets to enable mTRP uplink communication using an SDM transmission scheme. For example, when the RRC configuration enables DWS, one or more DCI messages that the network node transmits to the UE to schedule a PUSCH may include a waveform selection field that may have one bit to indicate whether the PUSCH is scheduled using the CP-OFDM waveform or the DFT-s-OFDM waveform. In addition, the RRC configuration to enable mTRP uplink communication using the SDM transmission scheme may indicate two SRS resource sets for codebook or non-codebook uplink transmission using the SDM transmission scheme. In such cases, the DCI message that the network node transmits to the UE to schedule a PUSCH may include an SRS resource set indicator field, which has two bits to indicate whether the PUSCH is configured to be performed in an sTRP transmission mode (e.g., when a codepoint indicated by the SRS resource set indicator field is "00" or "01") or using the SDM transmission scheme (e.g., when the codepoint indicated by the SRS resource set indicator field is "10").

Accordingly, when the RRC configuration enables DWS and configures SRS resource sets to enable mTRP uplink communication using the SDM transmission scheme, a DCI message scheduling a PUSCH may include a waveform selection field and an SRS resource set indicator field, which may collectively indicate three possible configurations. For example, in some aspects, the DCI message may indicate that the PUSCH scheduled by the DCI message is associated with the CP-OFDM waveform and the sTRP transmission mode, the DFT-s-OFDM waveform and the sTRP transmission mode, or the CP-OFDM waveform and the SDM transmission scheme (e.g., the SDM transmission scheme may lack support for the DFT-s-OFDM waveform). Furthermore, as described herein, the DCI message may include one or more other fields that have a size and/or an interpretation that depends on which of the four possible configurations the DCI message indicates for the waveform and the transmission mode of the PUSCH.

As further shown in FIG. 7, and by reference number 720, the network node may transmit, and the UE may receive, a DCI message that schedules a PUSCH transmission, where the DCI message includes a waveform selection field that indicates whether the PUSCH transmission is to be performed using the CP-OFDM or DFT-s-OFDM waveform and an SRS resource set indicator field that indicates whether the PUSCH transmission is to be performed in the sTRP or SDM transmission mode. Accordingly, because there may be one or more other fields that have a size and/or an interpretation that depends on which of the three possible configurations the DCI message indicates for the waveform and the transmission mode of the PUSCH, the network node may apply one or more zero padding types to align the size of the DCI message, regardless of which configuration is indicated in the DCI message.

For example, in some aspects, a first zero padding type (e.g., a per DCI field alignment, or Type 1 zero padding) may be used for both the waveform selection field and the SRS resource set indicator field. In such cases, if a DCI field in the DCI message has a size that depends on a value of the waveform selection field and also depends on a value of the SRS resource set indicator field, the network node may determine a maximum size for the DCI field among the three possible configurations, and may pad zeros to the DCI field for the other two configurations until the size of the DCI field equals the maximum size among the three possible configurations.

Alternatively, in some aspects, a second zero padding type (e.g., a per DCI format alignment, or Type 2 zero padding) may be used for both the waveform selection field and the SRS resource set indicator field. In such cases, the network node may determine a maximum size for the DCI field among the three possible configurations, and may pad zeros to the end of the DCI message for the other two configurations until the size of the DCI message equals the maximum possible size.

Alternatively, in some aspects, the first zero padding type (e.g., a per DCI field alignment, or Type 1 zero padding) may be used for the waveform selection field and the second zero padding type (e.g., a per DCI format alignment, or Type 2 zero padding) may be used for the SRS resource set indicator field (e.g., for switching between the sTRP and SDM transmission schemes). In such cases, among the two possibilities for the waveform selection field (e.g., CP-OFDM or DFT-s-OFDM), given a first possible value of the SRS resource set indicator field (e.g., sTRP), the network node may apply the first zero padding type, or per DCI field alignment, to each DCI field that is a function of the indicated waveform, which may result in a first possible size for the DCI message. The network node may then determine a second possible size of the DCI message corresponding to a possible configuration where the indicated waveform is CP-OFDM and the SRS resource set indicator field indicates that the transmission mode is SDM. Among the first possible size and the second possible size for the DCI message, the network node may then pad zeros at the end of the DCI message with the smaller size until the DCI size is the same as the DCI message with the larger size (e.g., the size of the transmitted DCI message is the larger of the two possible sizes for the DCI message).

Alternatively, in some aspects, the second zero padding type (e.g., a per DCI format alignment, or Type 2 zero padding) may be used for the waveform selection field and the first zero padding type (e.g., a per DCI field alignment, or Type 1 zero padding) may be used for the SRS resource set indicator field (e.g., for switching between the sTRP and SDM transmission schemes). In such cases, among the two possibilities for the SRS resource set indicator field (e.g., sTRP or SFN), given a first possible value of the waveform selection field (e.g., CP-OFDM), the network node may apply the first zero padding type, or per DCI field alignment, to each DCI field that is a function of the indicated SRS resource sets, which may result in a first possible size for the DCI message. The network node may then determine a second possible size of the DCI message corresponding to a possible configuration where the indicated waveform is DFT-s-OFDM and the SRS resource set indicator field indicates that the transmission mode is sTRP. Among the first possible size and the second possible size for the DCI message, the network node may then pad zeros at the end of the DCI message with the smaller size until the DCI size is the same as the DCI message with the larger size (e.g., the size of the transmitted DCI message is the larger of the two possible sizes for the DCI message).

In some aspects, the zero padding type(s) used for the waveform selection field and the SRS resource set indicator field may be based on signaling that the UE transmits to the network node to indicate one or more capabilities of the UE. For example, in some aspects, the signaling transmitted from the UE to the network may indicate a capability of the UE to support DWS or dynamic switching between the sTRP and SDM transmission schemes by interpreting that the DCI message scheduling the PUSCH is constructed using a particular zero padding type (e.g., the first zero padding type or the second zero padding type). Additionally, or alternatively, the signaling transmitted from the UE to the network may indicate a capability of the UE to jointly support DWS and dynamic switching between the sTRP and SDM transmission schemes. Additionally, or alternatively, the signaling transmitted from the UE to the network may indicate a capability of the UE to jointly support DWS and dynamic switching between the sTRP and SDM transmission schemes based on the DCI message scheduling the PUSCH being constructed using a particular zero padding type for the waveform selection field and a particular zero padding type for dynamic switching between different TRP transmission schemes.

As further shown in FIG. 7, and by reference number 730, the UE may transmit, and the network node may receive, a PUSCH transmission associated with the waveform and the sTRP/mTRP transmission mode indicated in the DCI message. For example, in some aspects, the UE may decode the DCI message based on the one or more zero padding types that are applied to the DCI message, which may ensure that the DCI message has the same size regardless of whether the PUSCH transmission is scheduled using the CP-OFDM waveform or the DFT-s-OFDM waveform, and regardless of whether the PUSCH transmission is scheduled in the sTRP or SDM mode. Furthermore, in cases where the RRC-configured mTRP mode is the SDM mode, which does not support the DFT-s-OFDM waveform, the UE may generally assume or expect the waveform selection field to indicate the CP-OFDM waveform (with transform precoding disabled) in cases where the SRS resource set indicator field indicates that the PUSCH transmission mode is the SDM mode. Furthermore, upon decoding the DCI message and reading the values of the waveform selection field and the SRS resource set indicator field, the UE may read and interpret the remaining fields in the DCI message to determine the appropriate parameters to be applied to the PUSCH transmission.

As indicated above, FIG. 7 is provided as an example. Other examples may differ from what is described with respect to FIG. 7.

Figure 8:
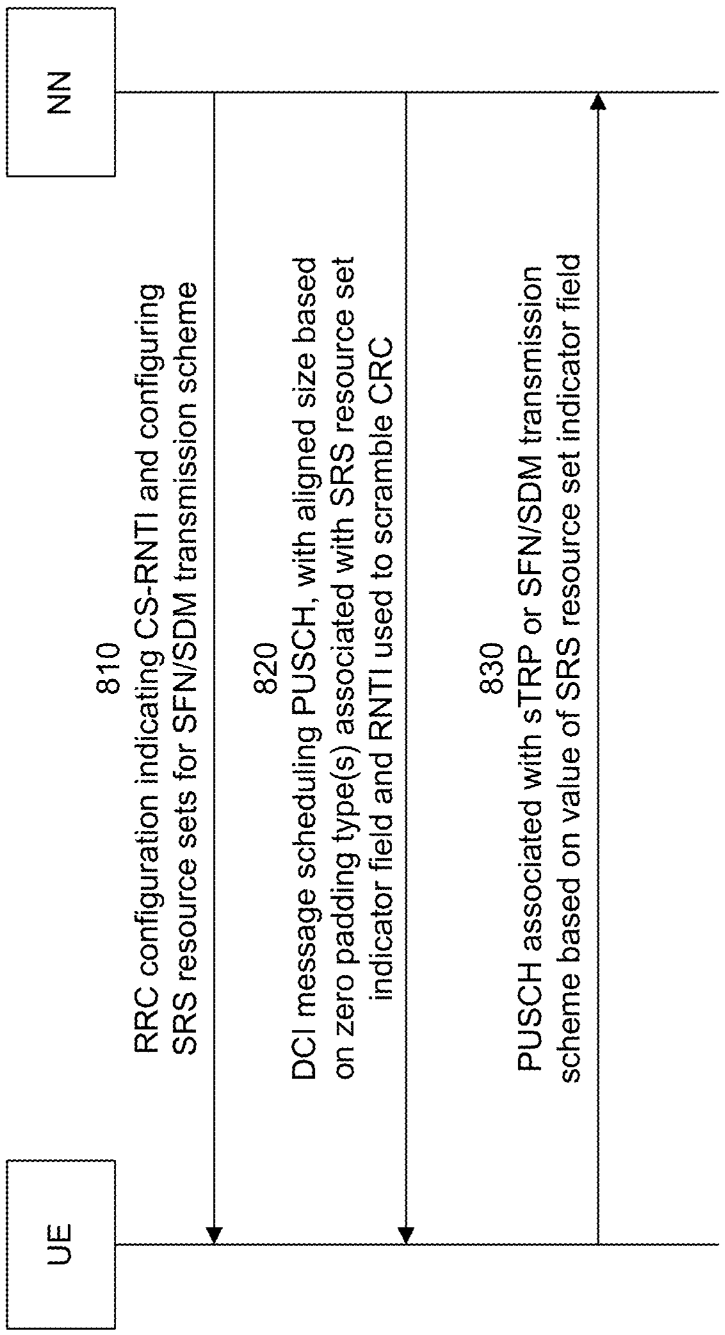

FIG. 8 is a diagram illustrating an example 800 associated with DCI size alignment for scheduling uplink transmission, in accordance with the present disclosure. As shown in FIG. 8, example 800 includes communication between a network node (e.g., network node 110) and a UE (e.g., UE 120). In some aspects, the network node may include or may be associated with multiple TRPs that can be operated in an mTRP mode (e.g., either an SFN mode or an SDM mode) or in an sTRP mode. In some aspects, the network node and the UE may communicate in a wireless network, such as wireless network 100. The network node and the UE may communicate via a wireless access link, which may include an uplink and a downlink.

In some aspects, as shown in FIG. 8, and by reference number 810, the network node may transmit, and the UE may receive, an RRC configuration that configures a CS-RNTI for the UE and configures SRS resource sets to enable mTRP uplink communication using an SFN or SDM transmission scheme. For example, when the RRC configuration indicates a CS-RNTI, a DCI message scheduling a PUSCH transmission includes a CRC that can be scrambled by the CS-RNTI or by a C-RNTI. In addition, the RRC configuration to enable mTRP uplink communication using the SFN transmission scheme may indicate two SRS resource sets for codebook or non-codebook uplink transmission using the RRC-configured mTRP transmission scheme. In such cases, the DCI message that the network node transmits to the UE to schedule a PUSCH may include an SRS resource set indicator field, which has two bits to indicate whether the PUSCH is configured to be performed in an sTRP transmission mode (e.g., when a codepoint indicated by the SRS resource set indicator field is "00" or "01") or using the mTRP transmission scheme (e.g., when the codepoint indicated by the SRS resource set indicator field is "10" to enable SFN or SDM transmission).

Accordingly, when the RRC configuration indicates a CS-RNTI and configures SRS resource sets to enable mTRP uplink communication using an SFN or SDM transmission scheme, a DCI message scheduling a PUSCH may include an SRS resource set indicator field and a CRC that is scrambled by the CS-RNTI or the C-RNTI, which results in four possible configurations for the DCI message. For example, in some aspects, the DCI message may indicate that the PUSCH scheduled by the DCI message is associated with the sTRP transmission mode with the CRC scrambled by the C-RNTI, may indicate that the PUSCH is associated with the sTRP transmission mode with the CRC scrambled by the CS-RNTI, may indicate that the PUSCH is associated with the SFN or SDM transmission mode with the CRC scrambled by the C-RNTI, or may indicate that the PUSCH is associated with the SFN or SDM transmission mode with the CRC scrambled by the CS-RNTI. Furthermore, the DCI message may include one or more other fields that have a size and/or an interpretation that depends on which of the four possible configurations are indicated by the DCI message.

As further shown in FIG. 8, and by reference number 820, the network node may transmit, and the UE may receive, a DCI message that schedules a PUSCH transmission, where the DCI message includes an SRS resource set indicator field that indicates whether the PUSCH transmission is to be performed in the sTRP or the mTRP transmission mode, and a CRC that is scrambled by a C-RNTI or a CS-RNTI. Accordingly, because there may be one or more other fields that have a size and/or an interpretation that depends on the transmission mode indicated by the SRS resource set indicator field and the RNTI used to scramble the CRC of the DCI message, the network node may apply one or more zero padding types to align the size of the DCI message, regardless of which configuration is indicated in the DCI message.

For example, in some aspects, a first zero padding type (e.g., a per DCI field alignment, or Type 1 zero padding) may be used for both the SRS resource set indicator field and the DCI feature related to the RNTI used to scramble the CRC. In such cases, if a DCI field in the DCI message has a size that depends on a value of the SRS resource set indicator field and the RNTI used to scramble the CRC of the DCI message, the network node may determine a maximum size for the DCI field among the four possible configurations, and may pad zeros to the DCI field for the other three configurations until the size of the DCI field equals the maximum size among the four possible configurations.

Alternatively, in some aspects, the first zero padding type (e.g., a per DCI field alignment, or Type 1 zero padding) may be used for distinguishing the RNTI used to scramble the CRC of the DCI message, and the second zero padding type (e.g., a per DCI format alignment, or Type 2 zero padding) may be used for the SRS resource set indicator field (e.g., for switching between the sTRP and SFN/SDM transmission schemes). In such cases, among the two possibilities for the RNTI used to scramble the CRC (e.g., a C-RNTI or a CS-RNTI), given a first possible value of the SRS resource set indicator field (e.g., sTRP), the network node may apply the first zero padding type, or per DCI field alignment, to each DCI field that is a function of the RNTI used to scramble the CRC of the DCI message, which may result in a first possible size for the DCI message. The network node may then determine, among the two possibilities for the RNTI used to scramble the CRC (e.g., a C-RNTI or a CS-RNTI), given a second possible value of the SRS resource set indicator field (e.g., enabling the SFN/SDM transmission mode), the network node may apply the first zero padding type, or per DCI field alignment, to each DCI field that is a function of the RNTI used to scramble the CRC, which may result in a second possible size for the DCI message. Among the first possible size and the second possible size for the DCI message, the network node may then pad zeros at the end of the DCI message with the smaller size until the DCI size is the same as the DCI message with the larger size (e.g., the size of the transmitted DCI message is the larger of the two possible sizes for the DCI message).

As further shown in FIG. 8, and by reference number 830, the UE may transmit, and the network node may receive, a PUSCH transmission associated with the STRP/mTRP transmission mode indicated in the DCI message. For example, in some aspects, the UE may decode the DCI message based on the one or more zero padding types that are applied to the DCI message, which may ensure that the DCI message has the same size regardless of whether the PUSCH transmission is scheduled in the sTRP or SFN/SDM mode, and regardless of whether the CRC of the DCI message is scrambled by a C-RNTI or a CS-RNTI. Furthermore, upon decoding the DCI message and reading the values of the SRS resource set indicator field and determining which RNTI was used to scramble the CRC of the DCI message, the UE may read and interpret the remaining fields in the DCI message to determine the appropriate parameters to be applied to the PUSCH transmission.

As indicated above, FIG. 8 is provided as an example. Other examples may differ from what is described with respect to FIG. 8.

Figure 9:
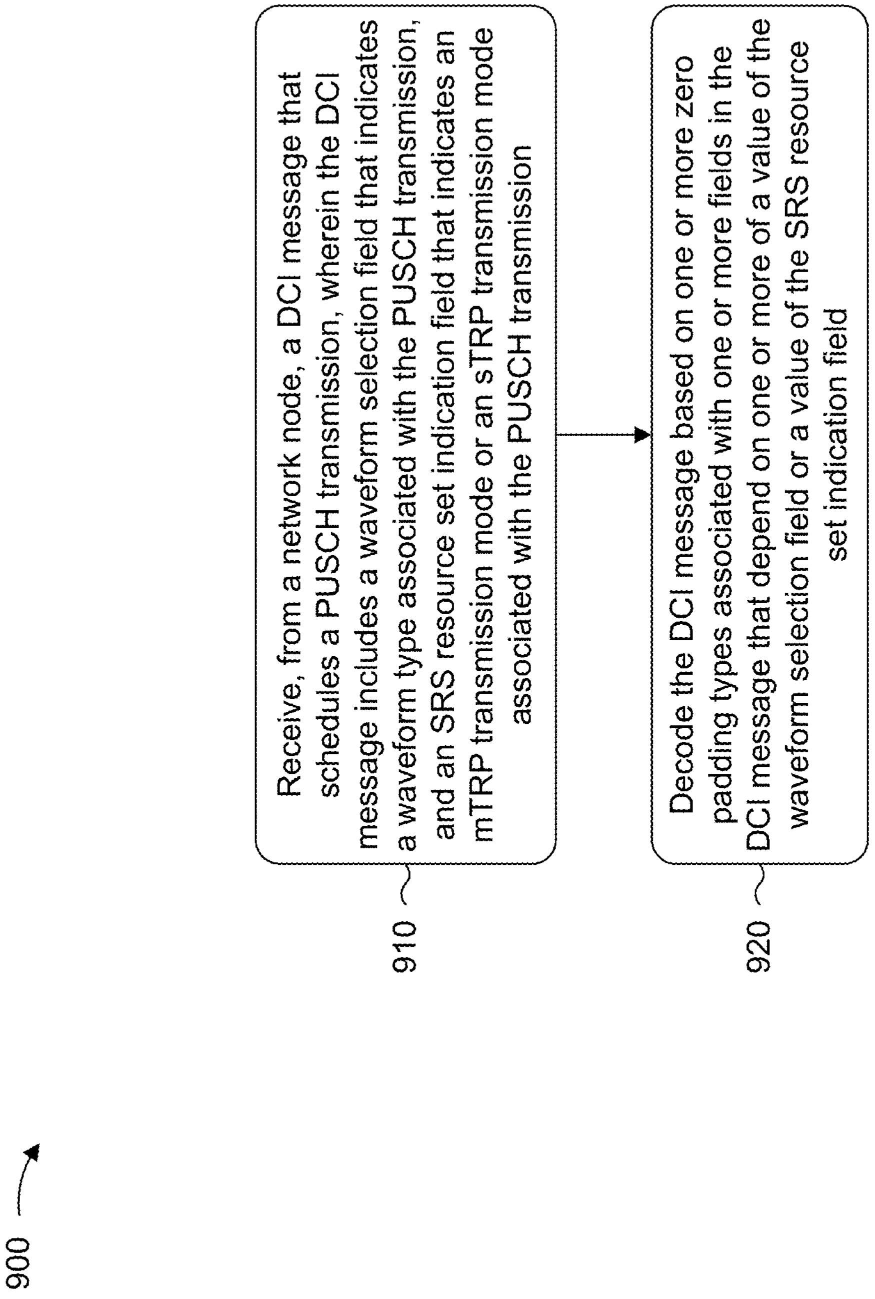
FIGS. 9-10 are diagrams illustrating example processes associated with DCI size alignment for scheduling uplink transmission, in accordance with the present disclosure.

FIG. 9 is a diagram illustrating an example process 900 performed, for example, by a UE, in accordance with the present disclosure. Example process 900 is an example where the UE (e.g., UE 120) performs operations associated with DCI size alignment for scheduling uplink transmission.

As shown in FIG. 9, in some aspects, process 900 may include receiving, from a network node, a DCI message that schedules a PUSCH transmission, wherein the DCI message includes: a waveform selection field that indicates a waveform type associated with the PUSCH transmission, and an SRS resource set indication field that indicates an mTRP transmission mode or an sTRP transmission mode associated with the PUSCH transmission (block 910). For example, the UE (e.g., using reception component 1102 and/or communication manager 1106, depicted in FIG. 11) may receive, from a network node, a DCI message that schedules a PUSCH transmission, wherein the DCI message includes: a waveform selection field that indicates a waveform type associated with the PUSCH transmission, and an SRS resource set indication field that indicates an mTRP transmission mode or an sTRP transmission mode associated with the PUSCH transmission, as described above.

As further shown in FIG. 9, in some aspects, process 900 may include decoding the DCI message based on one or more zero padding types associated with one or more fields in the DCI message that depend on one or more of a value of the waveform selection field or a value of the SRS resource set indication field (block 920). For example, the UE (e.g., using communication manager 1106, depicted in FIG. 11) may decode the DCI message based on one or more zero padding types associated with one or more fields in the DCI message that depend on one or more of a value of the waveform selection field or a value of the SRS resource set indication field, as described above.

Process 900 may include additional aspects, such as any single aspect or any combination of aspects described below and/or in connection with one or more other processes described elsewhere herein.

In a first aspect, the waveform selection field indicates whether the waveform type associated with the PUSCH transmission is a CP-OFDM waveform or a DFT-s-OFDM waveform, and the SRS resource set indication field indicates whether the PUSCH transmission is associated with a SFN mTRP transmission mode or the sTRP transmission mode.

In a second aspect, alone or in combination with the first aspect, a size of each field in the DCI message that depends on the value of the waveform selection field and the value of the SRS resource set indication field has a size corresponding to a maximum size for the field based on the one or more zero padding types including a per DCI field alignment applied to the waveform selection field and the SRS resource set indication field.

In a third aspect, alone or in combination with one or more of the first and second aspects, a size of the DCI message corresponds to a maximum size for the DCI message based on the one or more zero padding types including a per DCI format alignment applied to the waveform selection field and the SRS resource set indication field.

In a fourth aspect, alone or in combination with one or more of the first through third aspects, the one or more zero padding types include a per DCI field alignment applied to each field in the DCI message that has a size that depends on the value of the waveform selection field, and a per DCI format alignment applied to the DCI message based on the DCI having one or more fields that have sizes that depend on a value of the SRS resource set indication field.

In a fifth aspect, alone or in combination with one or more of the first through fourth aspects, the one or more zero padding types include a per DCI field alignment applied to each field in the DCI message that has a size that depends on the value of the SRS resource set indication field, and a per DCI format alignment applied to the DCI message based on the DCI having one or more fields that have sizes that depend on a value of the waveform selection field.

In a sixth aspect, alone or in combination with one or more of the first through fifth aspects, the SRS resource set indication field indicates whether the PUSCH transmission is associated with a SDM mTRP transmission mode or the sTRP transmission mode, and the waveform selection field indicates that the waveform type associated with the PUSCH transmission is a CP-OFDM waveform based on the SRS resource set indication field indicating that the PUSCH transmission is associated with the SDM mTRP transmission mode, or whether the waveform type associated with the PUSCH transmission is the CP-OFDM waveform or a DFT-s-OFDM waveform based on the SRS resource set indication field indicating that the PUSCH transmission is associated with the sTRP transmission mode.

In a seventh aspect, alone or in combination with one or more of the first through sixth aspects, a size of each field in the DCI message that depends on the value of the waveform selection field and the value of the SRS resource set indication field has a size corresponding to a maximum size for the field based on the one or more zero padding types including a per DCI field alignment applied to the waveform selection field and the SRS resource set indication field.

In an eighth aspect, alone or in combination with one or more of the first through seventh aspects, a size of the DCI message corresponds to a maximum size for the DCI message based on the one or more zero padding types including a per DCI format alignment applied to the waveform selection field and the SRS resource set indication field.

In a ninth aspect, alone or in combination with one or more of the first through eighth aspects, the one or more zero padding types include a per DCI field alignment applied to each field in the DCI message that has a size that depends on the value of the waveform selection field, and a per DCI format alignment applied to the DCI message based on the DCI having one or more fields that have sizes that depend on a value of the SRS resource set indication field.

In a tenth aspect, alone or in combination with one or more of the first through ninth aspects, the one or more zero padding types include a per DCI field alignment applied to each field in the DCI message that has a size that depends on the value of the SRS resource set indication field, and a per DCI format alignment applied to the DCI message based on the DCI having one or more fields that have sizes that depend on a value of the waveform selection field.

In an eleventh aspect, alone or in combination with one or more of the first through tenth aspects, the SRS resource set indication field indicates whether the PUSCH transmission is associated with the mTRP transmission mode or the sTRP transmission mode, and the DCI message includes a CRC scrambled by a C-RNTI or a CS-RNTI.

In a twelfth aspect, alone or in combination with one or more of the first through eleventh aspects, a size of each field in the DCI message that depends on whether the CRC of the DCI message is scrambled by the C-RNTI or the CS-RNTI and depends on the value of the SRS resource set indication field has a size corresponding to a maximum size for the field based on the one or more zero padding types including a per DCI field alignment.

In a thirteenth aspect, alone or in combination with one or more of the first through twelfth aspects, the one or more zero padding types include a per DCI field alignment applied to each field in the DCI message that has a size that depends on whether the CRC of the DCI message is scrambled by the C-RNTI or the CS-RNTI, and a per DCI format alignment applied to the DCI message based on the DCI having one or more fields that have sizes that depend on a value of the SRS resource set indication field.

In a fourteenth aspect, alone or in combination with one or more of the first through thirteenth aspects, process 900 includes transmitting, to the network node, signaling that indicates a capability to support one or more of DWS or dynamic switching between the mTRP transmission mode and the sTRP transmission mode based on a zero padding type associated with the DCI message, and the one or more zero padding types associated with the one or more fields in the DCI message are based on the capability.

In a fifteenth aspect, alone or in combination with one or more of the first through fourteenth aspects, process 900 includes transmitting, to the network node, signaling that indicates a capability to jointly support DWS and dynamic switching between the mTRP transmission mode and the sTRP transmission mode, and the one or more zero padding types associated with the one or more fields in the DCI message are based on the capability.

In a sixteenth aspect, alone or in combination with one or more of the first through fifteen aspects, process 900 includes transmitting, to the network node, signaling that indicates a capability to jointly support DWS and dynamic switching between the mTRP transmission mode and the sTRP transmission mode based on a first zero padding type being used for the waveform selection field and a second zero padding type being used for the SRS resource set indication field, and the one or more zero padding types associated with the one or more fields in the DCI message are based on the capability.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
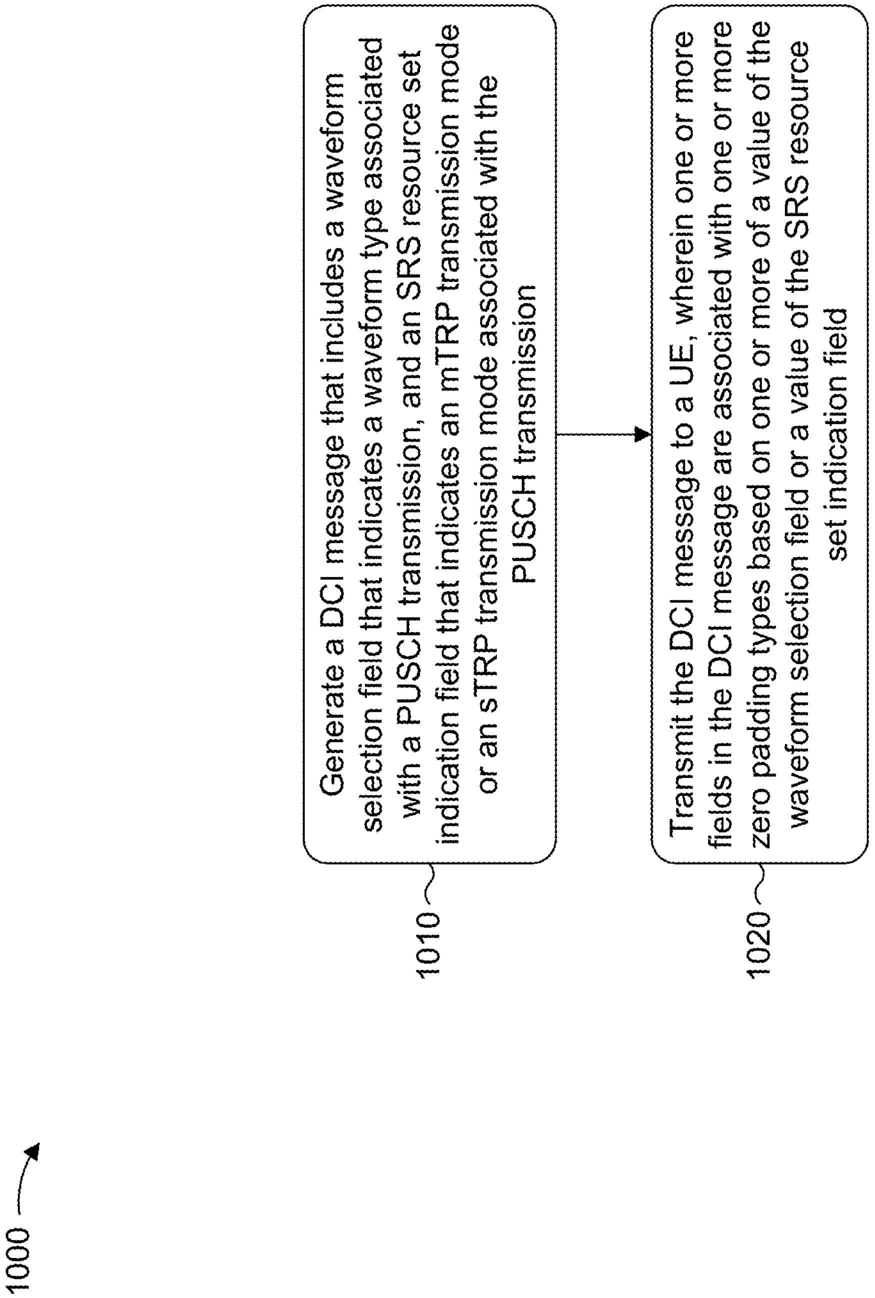

FIG. 10 is a diagram illustrating an example process 1000 performed, for example, by a network node, in accordance with the present disclosure. Example process 1000 is an example where the network node (e.g., network node 110) performs operations associated with DCI size alignment for uplink scheduling.

As shown in FIG. 10, in some aspects, process 1000 may include generating a DCI message that includes: a waveform selection field that indicates a waveform type associated with a PUSCH transmission, and an SRS resource set indication field that indicates an mTRP transmission mode or an sTRP transmission mode associated with the PUSCH transmission (block 1010). For example, the network node (e.g., using communication manager 1206, depicted in FIG. 12) may generate a DCI message that includes: a waveform selection field that indicates a waveform type associated with a PUSCH transmission, and an SRS resource set indication field that indicates an mTRP transmission mode or an sTRP transmission mode associated with the PUSCH transmission, as described above.

As further shown in FIG. 10, in some aspects, process 1000 may include transmitting the DCI message to a UE, wherein one or more fields in the DCI message are associated with one or more zero padding types based on one or more of a value of the waveform selection field or a value of the SRS resource set indication field (block 1020). For example, the network node (e.g., using transmission component 1204 and/or communication manager 1206, depicted in FIG. 12) may transmit the DCI message to a UE, wherein one or more fields in the DCI message are associated with one or more zero padding types based on one or more of a value of the waveform selection field or a value of the SRS resource set indication field, as described above.

Process 1000 may include additional aspects, such as any single aspect or any combination of aspects described below and/or in connection with one or more other processes described elsewhere herein.

In a first aspect, the waveform selection field indicates whether the waveform type associated with the PUSCH transmission is a CP-OFDM waveform or a DFT-s-OFDM waveform, and the SRS resource set indication field indicates whether the PUSCH transmission is associated with a SFN mTRP transmission mode or the sTRP transmission mode.

In a second aspect, alone or in combination with the first aspect, a size of each field in the DCI message that depends on the value of the waveform selection field and the value of the SRS resource set indication field has a size corresponding to a maximum size for the field based on the one or more zero padding types including a per DCI field alignment applied to the waveform selection field and the SRS resource set indication field.

In a third aspect, alone or in combination with one or more of the first and second aspects, a size of the DCI message corresponds to a maximum size for the DCI message based on the one or more zero padding types including a per DCI format alignment applied to the waveform selection field and the SRS resource set indication field.

In a fourth aspect, alone or in combination with one or more of the first through third aspects, the one or more zero padding types include a per DCI field alignment applied to each field in the DCI message that has a size that depends on the value of the waveform selection field, and a per DCI format alignment applied to the DCI message based on the DCI having one or more fields that have sizes that depend on a value of the SRS resource set indication field.

In a fifth aspect, alone or in combination with one or more of the first through fourth aspects, the one or more zero padding types include a per DCI field alignment applied to each field in the DCI message that has a size that depends on the value of the SRS resource set indication field, and a per DCI format alignment applied to the DCI message based on the DCI having one or more fields that have sizes that depend on a value of the waveform selection field.

In a sixth aspect, alone or in combination with one or more of the first through fifth aspects, the SRS resource set indication field indicates whether the PUSCH transmission is associated with a SDM mTRP transmission mode or the sTRP transmission mode, and the waveform selection field indicates that the waveform type associated with the PUSCH transmission is a CP-OFDM waveform based on the SRS resource set indication field indicating that the PUSCH transmission is associated with the SDM mTRP transmission mode, or whether the waveform type associated with the PUSCH transmission is the CP-OFDM waveform or a DFT-s-OFDM waveform based on the SRS resource set indication field indicating that the PUSCH transmission is associated with the sTRP transmission mode.

In a seventh aspect, alone or in combination with one or more of the first through sixth aspects, a size of each field in the DCI message that depends on the value of the waveform selection field and the value of the SRS resource set indication field has a size corresponding to a maximum size for the field based on the one or more zero padding types including a per DCI field alignment applied to the waveform selection field and the SRS resource set indication field.

In an eighth aspect, alone or in combination with one or more of the first through seventh aspects, a size of the DCI message corresponds to a maximum size for the DCI message based on the one or more zero padding types including a per DCI format alignment applied to the waveform selection field and the SRS resource set indication field.

In a ninth aspect, alone or in combination with one or more of the first through eighth aspects, the one or more zero padding types include a per DCI field alignment applied to each field in the DCI message that has a size that depends on the value of the waveform selection field, and a per DCI format alignment applied to the DCI message based on the DCI having one or more fields that have sizes that depend on a value of the SRS resource set indication field.

In a tenth aspect, alone or in combination with one or more of the first through ninth aspects, the one or more zero padding types include a per DCI field alignment applied to each field in the DCI message that has a size that depends on the value of the SRS resource set indication field, and a per DCI format alignment applied to the DCI message based on the DCI having one or more fields that have sizes that depend on a value of the waveform selection field.

In an eleventh aspect, alone or in combination with one or more of the first through tenth aspects, the SRS resource set indication field indicates whether the PUSCH transmission is associated with the mTRP transmission mode or the sTRP transmission mode, and the DCI message includes a CRC scrambled by a C-RNTI or a CS-RNTI.

In a twelfth aspect, alone or in combination with one or more of the first through eleventh aspects, a size of each field in the DCI message that depends on whether the CRC of the DCI message is scrambled by the C-RNTI or the CS-RNTI and depends on the value of the SRS resource set indication field has a size corresponding to a maximum size for the field based on the one or more zero padding types including a per DCI field alignment.

In a thirteenth aspect, alone or in combination with one or more of the first through twelfth aspects, the one or more zero padding types include a per DCI field alignment applied to each field in the DCI message that has a size that depends on whether the CRC of the DCI message is scrambled by the C-RNTI or the CS-RNTI, and a per DCI format alignment applied to the DCI message based on the DCI having one or more fields that have sizes that depend on a value of the SRS resource set indication field.

In a fourteenth aspect, alone or in combination with one or more of the first through thirteenth aspects, process 1000 includes receiving, from the UE, signaling that indicates a capability to support one or more of DWS or dynamic switching between the mTRP transmission mode and the sTRP transmission mode based on a zero padding type associated with the DCI message, and the one or more zero padding types associated with the one or more fields in the DCI message are based on the capability.

In a fifteenth aspect, alone or in combination with one or more of the first through fourteenth aspects, process 1000 includes receiving, from the UE, signaling that indicates a capability to jointly support DWS and dynamic switching between the mTRP transmission mode and the sTRP transmission mode, and the one or more zero padding types associated with the one or more fields in the DCI message are based on the capability.

In a sixteenth aspect, alone or in combination with one or more of the first through fifteen aspects, process 1000 includes receiving, from the UE, signaling that indicates a capability to jointly support DWS and dynamic switching between the mTRP transmission mode and the sTRP transmission mode based on a first zero padding type being used for the waveform selection field and a second zero padding type being used for the SRS resource set indication field, and the one or more zero padding types associated with the one or more fields in the DCI message are based on the capability.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
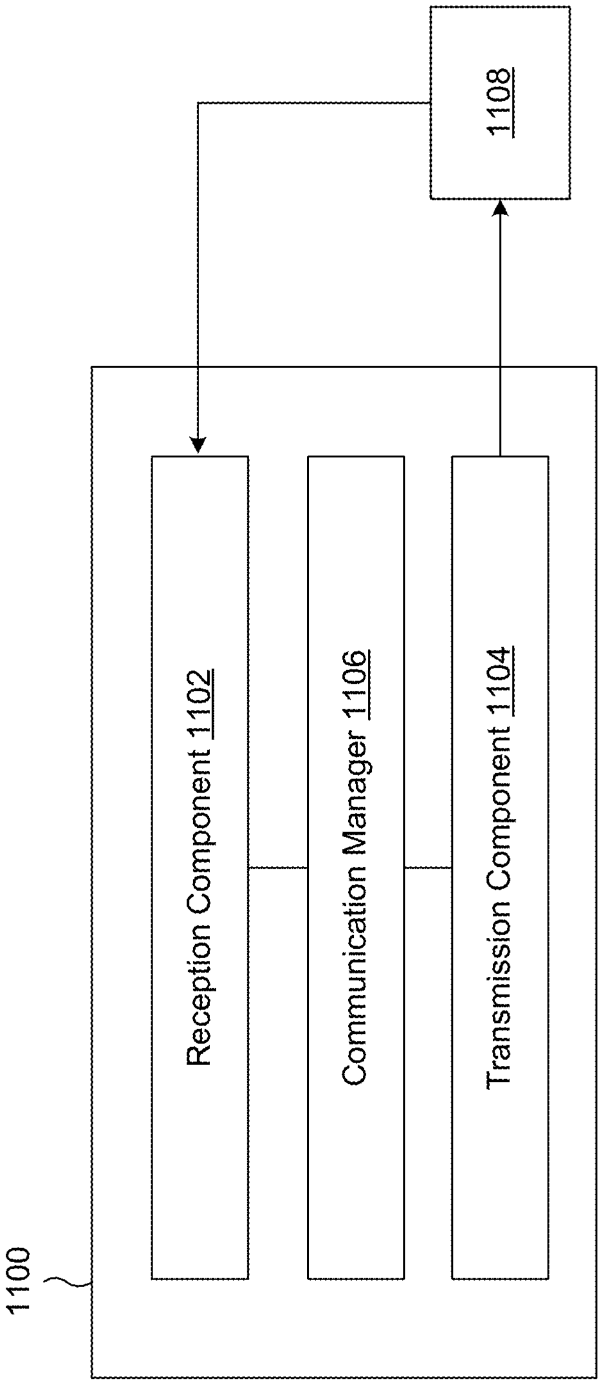
FIGS. 11-12 are diagrams of example apparatuses for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 6-8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive, from a network node, a DCI message that schedules a PUSCH transmission, wherein the DCI message includes a waveform selection field that indicates a waveform type associated with the PUSCH transmission, and an SRS resource set indication field that indicates an mTRP transmission mode or an sTRP transmission mode associated with the PUSCH transmission. The communication manager 1106 may decode the DCI message based on one or more zero padding types associated with one or more fields in the DCI message that depend on one or more of a value of the waveform selection field or a value of the SRS resource set indication field.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
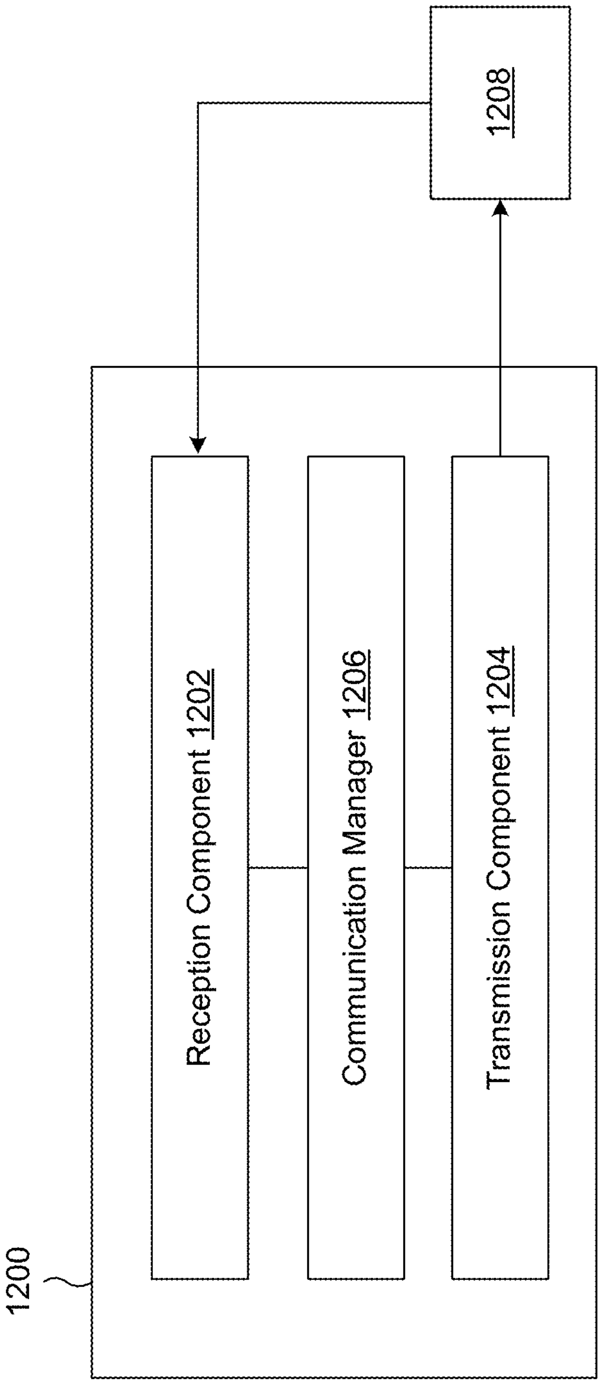

FIG. 12 is a diagram of an example apparatus 1200 for wireless communication, in accordance with the present disclosure. The apparatus 1200 may be a network node, or a network node may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 6-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The communication manager 1206 may generate a DCI message that includes a waveform selection field that indicates a waveform type associated with a PUSCH transmission, and an SRS resource set indication field that indicates an mTRP transmission mode or an sTRP transmission mode associated with the PUSCH transmission. The transmission component 1204 may transmit the DCI message to a UE, wherein one or more fields in the DCI message are associated with one or more zero padding types based on one or more of a value of the waveform selection field or a value of the SRS resource set indication field.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: receiving, from a network node, a DCI message that schedules a PUSCH transmission, wherein the DCI message includes: a waveform selection field that indicates a waveform type associated with the PUSCH transmission, and an SRS resource set indication field that indicates an mTRP transmission mode or an sTRP transmission mode associated with the PUSCH transmission; and decoding the DCI message based on one or more zero padding types associated with one or more fields in the DCI message that depend on one or more of a value of the waveform selection field or a value of the SRS resource set indication field.

Aspect 2: The method of Aspect 1, wherein: the waveform selection field indicates whether the waveform type associated with the PUSCH transmission is a CP-OFDM waveform or a DFT-s-OFDM waveform, and the SRS resource set indication field indicates whether the PUSCH transmission is associated with a SFN mTRP transmission mode or the sTRP transmission mode.

Aspect 3: The method of Aspect 2, wherein a size of each field in the DCI message that depends on the value of the waveform selection field and the value of the SRS resource set indication field has a size corresponding to a maximum size for the field based on the one or more zero padding types including a per DCI field alignment applied to the waveform selection field and the SRS resource set indication field.

Aspect 4: The method of Aspect 2, wherein a size of the DCI message corresponds to a maximum size for the DCI message based on the one or more zero padding types including a per DCI format alignment applied to the waveform selection field and the SRS resource set indication field.

Aspect 5: The method of Aspect 2, wherein the one or more zero padding types include: a per DCI field alignment applied to each field in the DCI message that has a size that depends on the value of the waveform selection field, and a per DCI format alignment applied to the DCI message based on the DCI having one or more fields that have sizes that depend on a value of the SRS resource set indication field.

Aspect 6: The method of Aspect 2, wherein the one or more zero padding types include: a per DCI field alignment applied to each field in the DCI message that has a size that depends on the value of the SRS resource set indication field, and a per DCI format alignment applied to the DCI message based on the DCI having one or more fields that have sizes that depend on a value of the waveform selection field.

Aspect 7: The method of any of Aspects 1-6, wherein: the SRS resource set indication field indicates whether the PUSCH transmission is associated with a SDM mTRP transmission mode or the sTRP transmission mode, and the waveform selection field indicates: that the waveform type associated with the PUSCH transmission is a CP-OFDM waveform based on the SRS resource set indication field indicating that the PUSCH transmission is associated with the SDM mTRP transmission mode, or whether the waveform type associated with the PUSCH transmission is the CP-OFDM waveform or a DFT-s-OFDM waveform based on the SRS resource set indication field indicating that the PUSCH transmission is associated with the sTRP transmission mode.

Aspect 8: The method of Aspect 7, wherein a size of each field in the DCI message that depends on the value of the waveform selection field and the value of the SRS resource set indication field has a size corresponding to a maximum size for the field based on the one or more zero padding types including a per DCI field alignment applied to the waveform selection field and the SRS resource set indication field.

Aspect 9: The method of Aspect 7, wherein a size of the DCI message corresponds to a maximum size for the DCI message based on the one or more zero padding types including a per DCI format alignment applied to the waveform selection field and the SRS resource set indication field.

Aspect 10: The method of Aspect 7, wherein the one or more zero padding types include: a per DCI field alignment applied to each field in the DCI message that has a size that depends on the value of the waveform selection field, and a per DCI format alignment applied to the DCI message based on the DCI having one or more fields that have sizes that depend on a value of the SRS resource set indication field.

Aspect 11: The method of Aspect 7, wherein the one or more zero padding types include: a per DCI field alignment applied to each field in the DCI message that has a size that depends on the value of the SRS resource set indication field, and a per DCI format alignment applied to the DCI message based on the DCI having one or more fields that have sizes that depend on a value of the waveform selection field.

Aspect 12: The method of any of Aspects 1-11, wherein: the SRS resource set indication field indicates whether the PUSCH transmission is associated with the mTRP transmission mode or the sTRP transmission mode, and the DCI message includes a CRC scrambled by a C-RNTI or a CS-RNTI.

Aspect 13: The method of Aspect 12, wherein a size of each field in the DCI message that depends on whether the CRC of the DCI message is scrambled by the C-RNTI or the CS-RNTI and depends on the value of the SRS resource set indication field has a size corresponding to a maximum size for the field based on the one or more zero padding types including a per DCI field alignment.

Aspect 14: The method of Aspect 12, wherein the one or more zero padding types include: a per DCI field alignment applied to each field in the DCI message that has a size that depends on whether the CRC of the DCI message is scrambled by the C-RNTI or the CS-RNTI, and a per DCI format alignment applied to the DCI message based on the DCI having one or more fields that have sizes that depend on a value of the SRS resource set indication field.

Aspect 15: The method of any of Aspects 1-14, further comprising: transmitting, to the network node, signaling that indicates a capability to support one or more of DWS or dynamic switching between the mTRP transmission mode and the sTRP transmission mode based on a zero padding type associated with the DCI message, wherein the one or more zero padding types associated with the one or more fields in the DCI message are based on the capability.

Aspect 16: The method of any of Aspects 1-15, further comprising:

transmitting, to the network node, signaling that indicates a capability to jointly support DWS and dynamic switching between the mTRP transmission mode and the sTRP transmission mode, wherein the one or more zero padding types associated with the one or more fields in the DCI message are based on the capability.

Aspect 17: The method of any of Aspects 1-16, further comprising: transmitting, to the network node, signaling that indicates a capability to jointly support DWS and dynamic switching between the mTRP transmission mode and the sTRP transmission mode based on a first zero padding type being used for the waveform selection field and a second zero padding type being used for the SRS resource set indication field, wherein the one or more zero padding types associated with the one or more fields in the DCI message are based on the capability.

Aspect 18: A method of wireless communication performed by a network node, comprising: generating a DCI message that includes: a waveform selection field that indicates a waveform type associated with a PUSCH transmission, and an SRS resource set indication field that indicates an mTRP transmission mode or an sTRP transmission mode associated with the PUSCH transmission; and transmitting the DCI message to a UE, wherein one or more fields in the DCI message are associated with one or more zero padding types based on one or more of a value of the waveform selection field or a value of the SRS resource set indication field.

Aspect 19: The method of Aspect 18, wherein: the waveform selection field indicates whether the waveform type associated with the PUSCH transmission is a CP-OFDM waveform or a DFT-s-OFDM waveform, and the SRS resource set indication field indicates whether the PUSCH transmission is associated with a SFN mTRP transmission mode or the sTRP transmission mode.

Aspect 20: The method of Aspect 19, wherein a size of each field in the DCI message that depends on the value of the waveform selection field and the value of the SRS resource set indication field has a size corresponding to a maximum size for the field based on the one or more zero padding types including a per DCI field alignment applied to the waveform selection field and the SRS resource set indication field.

Aspect 21: The method of Aspect 19, wherein a size of the DCI message corresponds to a maximum size for the DCI message based on the one or more zero padding types including a per DCI format alignment applied to the waveform selection field and the SRS resource set indication field.

Aspect 22: The method of Aspect 19, wherein the one or more zero padding types include: a per DCI field alignment applied to each field in the DCI message that has a size that depends on the value of the waveform selection field, and a per DCI format alignment applied to the DCI message based on the DCI having one or more fields that have sizes that depend on a value of the SRS resource set indication field.

Aspect 23: The method of Aspect 19, wherein the one or more zero padding types include: a per DCI field alignment applied to each field in the DCI message that has a size that depends on the value of the SRS resource set indication field, and a per DCI format alignment applied to the DCI message based on the DCI having one or more fields that have sizes that depend on a value of the waveform selection field.

Aspect 24: The method of any of Aspects 18-23, wherein: the SRS resource set indication field indicates whether the PUSCH transmission is associated with a SDM mTRP transmission mode or the sTRP transmission mode, and the waveform selection field indicates: that the waveform type associated with the PUSCH transmission is a CP-OFDM waveform based on the SRS resource set indication field indicating that the PUSCH transmission is associated with the SDM mTRP transmission mode, or whether the waveform type associated with the PUSCH transmission is the CP-OFDM waveform or a DFT-s-OFDM waveform based on the SRS resource set indication field indicating that the PUSCH transmission is associated with the sTRP transmission mode.

Aspect 25: The method of Aspect 24, wherein a size of each field in the DCI message that depends on the value of the waveform selection field and the value of the SRS resource set indication field has a size corresponding to a maximum size for the field based on the one or more zero padding types including a per DCI field alignment applied to the waveform selection field and the SRS resource set indication field.

Aspect 26: The method of Aspect 24, wherein a size of the DCI message corresponds to a maximum size for the DCI message based on the one or more zero padding types including a per DCI format alignment applied to the waveform selection field and the SRS resource set indication field.

Aspect 27: The method of Aspect 24, wherein the one or more zero padding types include: a per DCI field alignment applied to each field in the DCI message that has a size that depends on the value of the waveform selection field, and a per DCI format alignment applied to the DCI message based on the DCI having one or more fields that have sizes that depend on a value of the SRS resource set indication field.

Aspect 28: The method of Aspect 24, wherein the one or more zero padding types include: a per DCI field alignment applied to each field in the DCI message that has a size that depends on the value of the SRS resource set indication field, and a per DCI format alignment applied to the DCI message based on the DCI having one or more fields that have sizes that depend on a value of the waveform selection field.

Aspect 29: The method of Aspect 24, wherein: the SRS resource set indication field indicates whether the PUSCH transmission is associated with the mTRP transmission mode or the sTRP transmission mode, and the DCI message includes a CRC scrambled by a C-RNTI or a CS-RNTI.

Aspect 30: The method of Aspect 29, wherein a size of each field in the DCI message that depends on whether the CRC of the DCI message is scrambled by the C-RNTI or the CS-RNTI and depends on the value of the SRS resource set indication field has a size corresponding to a maximum size for the field based on the one or more zero padding types including a per DCI field alignment.

Aspect 31: The method of Aspect 29, wherein the one or more zero padding types include: a per DCI field alignment applied to each field in the DCI message that has a size that depends on whether the CRC of the DCI message is scrambled by the C-RNTI or the CS-RNTI, and a per DCI format alignment applied to the DCI message based on the DCI having one or more fields that have sizes that depend on a value of the SRS resource set indication field.

Aspect 32: The method of any of Aspects 18-31, further comprising: receiving, from the UE, signaling that indicates a capability to support one or more of DWS or dynamic switching between the mTRP transmission mode and the sTRP transmission mode based on a zero padding type associated with the DCI message, wherein the one or more zero padding types associated with the one or more fields in the DCI message are based on the capability.

Aspect 33: The method of any of Aspects 18-32, further comprising: receiving, from the UE, signaling that indicates a capability to jointly support DWS and dynamic switching between the mTRP transmission mode and the sTRP transmission mode, wherein the one or more zero padding types associated with the one or more fields in the DCI message are based on the capability.

Aspect 34: The method of any of Aspects 18-33, further comprising: receiving, from the UE, signaling that indicates a capability to jointly support DWS and dynamic switching between the mTRP transmission mode and the sTRP transmission mode based on a first zero padding type being used for the waveform selection field and a second zero padding type being used for the SRS resource set indication field, wherein the one or more zero padding types associated with the one or more fields in the DCI message are based on the capability.

Aspect 35: An apparatus for wireless communication at a device, comprising a processor; memory coupled with the processor; and instructions stored in the memory and executable by the processor to cause the apparatus to perform the method of one or more of Aspects 1-34.

Aspect 36: A device for wireless communication, comprising a memory and one or more processors coupled to the memory, the one or more processors configured to perform the method of one or more of Aspects 1-34.

Aspect 37: An apparatus for wireless communication, comprising at least one means for performing the method of one or more of Aspects 1-34.

Aspect 38: A non-transitory computer-readable medium storing code for wireless communication, the code comprising instructions executable by a processor to perform the method of one or more of Aspects 1-34.

Aspect 39: A non-transitory computer-readable medium storing a set of instructions for wireless communication, the set of instructions comprising one or more instructions that, when executed by one or more processors of a device, cause the device to perform the method of one or more of Aspects 1-34.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a “processor” is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, “satisfying a threshold” may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to “at least one of” a list of items refers to any combination of those items, including single members. As an example, “at least one of: a, b, or c” is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles “a” and “an” are intended to include one or more items and may be used interchangeably with “one or more.” Further, as used herein, the article “the” is intended to include one or more items referenced in connection with the article “the” and may be used interchangeably with “the one or more.” Furthermore, as used herein, the terms “set” and “group” are intended to include one or more items and may be used interchangeably with “one or more.” Where only one item is intended, the phrase “only one” or similar language is used. Also, as used herein, the terms “has,” “have,” “having,” or the like are intended to be open-ended terms that do not limit an element that they modify (e.g., an element “having” A may also have B). Further, the phrase “based on” is intended to mean “based, at least in part, on” unless explicitly stated otherwise. Also, as used herein, the term “or” is intended to be inclusive when used in a series and may be used interchangeably with “and/or,” unless explicitly stated otherwise (e.g., if used in combination with “either” or “only one of”).

What is claimed is:

1. A method of wireless communication performed by a user equipment (UE), comprising:

receiving, from a network node, a downlink control information (DCI) message that schedules a physical uplink shared channel (PUSCH) transmission, wherein the DCI message has a fixed size based on one or more zero padding types of a plurality of zero padding types, and wherein the DCI message includes:

a waveform selection field that indicates a waveform type associated with the PUSCH transmission, and a sounding reference signal (SRS) resource set indication field that indicates a multiple transmission reception point (mTRP) transmission mode or a single transmission reception point (sTRP) transmission mode associated with the PUSCH transmission; and decoding the DCI message based on the one or more zero padding types associated with one or more fields in the DCI message that depend on one or more of a value of the waveform selection field or a value of the SRS resource set indication field.

2. The method of claim 1, wherein:

the waveform selection field indicates whether the waveform type associated with the PUSCH transmission is a cyclic prefix orthogonal frequency division multiplexing (CP-OFDM) waveform or a discrete Fourier transform spread orthogonal frequency division multiplexing (DFT-s-OFDM) waveform, and the SRS resource set indication field indicates whether the PUSCH transmission is associated with a single frequency network (SFN) mTRP transmission mode or the sTRP transmission mode.

3. The method of claim 2, wherein each field in the DCI message that depends on both the value of the waveform selection field and the value of the SRS resource set indication field has a size corresponding to a maximum size for the field based on the one or more zero padding types including a per DCI field alignment applied to the waveform selection field and the SRS resource set indication field.

4. The method of claim 2, wherein the fixed size of the DCI message corresponds to a maximum size for the DCI message based on the one or more zero padding types including a per DCI format alignment applied to the waveform selection field and the SRS resource set indication field.

5. The method of claim 2, wherein the one or more zero padding types include:

a per DCI field alignment applied to each field in the DCI message that has a size that depends on the value of the waveform selection field, and a per DCI format alignment applied to the DCI message based on the DCI having one or more fields that have sizes that depend on a value of the SRS resource set indication field.

6. The method of claim 2, wherein the one or more zero padding types include:

a per DCI field alignment applied to each field in the DCI message that has a size that depends on the value of the SRS resource set indication field, and a per DCI format alignment applied to the DCI message based on the DCI having one or more fields that have sizes that depend on a value of the waveform selection field.

7. The method of claim 1, wherein:

the SRS resource set indication field indicates whether the PUSCH transmission is associated with a spatial division multiplexing (SDM) mTRP transmission mode or the sTRP transmission mode, and the waveform selection field indicates:

that the waveform type associated with the PUSCH transmission is a cyclic prefix orthogonal frequency division multiplexing (CP-OFDM) waveform based on the SRS resource set indication field indicating that the PUSCH transmission is associated with the SDM mTRP transmission mode, or whether the waveform type associated with the PUSCH transmission is the CP-OFDM waveform or a discrete Fourier transform spread orthogonal frequency division multiplexing (DFT-s-OFDM) waveform based on the SRS resource set indication field indicating that the PUSCH transmission is associated with the sTRP transmission mode.

8. The method of claim 7, wherein a size of each field in the DCI message that depends on the value of the waveform selection field and the value of the SRS resource set indication field has a size corresponding to a maximum size for the field based on the one or more zero padding types including a per DCI field alignment applied to the waveform selection field and the SRS resource set indication field.

9. The method of claim 7, wherein a size of the DCI message corresponds to a maximum size for the DCI message based on the one or more zero padding types including a per DCI format alignment applied to the waveform selection field and the SRS resource set indication field.

10. The method of claim 7, wherein the one or more zero padding types include:

a per DCI field alignment applied to each field in the DCI message that has a size that depends on the value of the waveform selection field, and a per DCI format alignment applied to the DCI message based on the DCI having one or more fields that have sizes that depend on a value of the SRS resource set indication field.

11. The method of claim 7, wherein the one or more zero padding types include:

a per DCI field alignment applied to each field in the DCI message that has a size that depends on the value of the SRS resource set indication field, and a per DCI format alignment applied to the DCI message based on the DCI having one or more fields that have sizes that depend on a value of the waveform selection field.

12. The method of claim 1, wherein:

the SRS resource set indication field indicates whether the PUSCH transmission is associated with the mTRP transmission mode or the sTRP transmission mode, and the DCI message includes a cyclic redundancy check (CRC) scrambled by a cell radio network temporary identifier (C-RNTI) or a configured scheduling radio network temporary identifier (CS-RNTI).

13. The method of claim 12, wherein a size of each field in the DCI message that depends on whether the CRC of the DCI message is scrambled by the C-RNTI or the CS-RNTI and depends on the value of the SRS resource set indication field has a size corresponding to a maximum size for the field based on the one or more zero padding types including a per DCI field alignment.

14. The method of claim 12, wherein the one or more zero padding types include:

a per DCI field alignment applied to each field in the DCI message that has a size that depends on whether the CRC of the DCI message is scrambled by the C-RNTI or the CS-RNTI, and a per DCI format alignment applied to the DCI message based on the DCI having one or more fields that have sizes that depend on a value of the SRS resource set indication field.

15. The method of claim 1, further comprising:

transmitting, to the network node, signaling that indicates a capability to support one or more of dynamic waveform switching or dynamic switching between the mTRP transmission mode and the sTRP transmission mode based on a zero padding type associated with the DCI message, wherein the one or more zero padding types associated with the one or more fields in the DCI message are based on the capability.

16. The method of claim 1, further comprising:

transmitting, to the network node, signaling that indicates a capability to jointly support dynamic waveform switching and dynamic switching between the mTRP transmission mode and the sTRP transmission mode, wherein the one or more zero padding types associated with the one or more fields in the DCI message are based on the capability.

17. The method of claim 1, further comprising:

transmitting, to the network node, signaling that indicates a capability to jointly support dynamic waveform switching and dynamic switching between the mTRP transmission mode and the sTRP transmission mode based on a first zero padding type of the plurality of zero padding types being used for the waveform selection field and a second zero padding type of the plurality of zero padding types being used for the SRS resource set indication field, wherein the one or more zero padding types associated with the one or more fields in the DCI message are based on the capability.

18. The method of claim 1, wherein the plurality of zero padding types includes a first zero padding type and a second zero padding type, the first zero padding type associated with a per DCI field alignment and the second zero padding type associated with a per DCI format alignment.

19. A method of wireless communication performed by a network node, comprising:

generating a downlink control information (DCI) message, wherein the DCI message has a fixed size based on one or more zero padding types of a plurality of zero padding types, and wherein the DCI message includes:

a waveform selection field that indicates a waveform type associated with a physical uplink shared channel (PUSCH) transmission, and a sounding reference signal (SRS) resource set indication field that indicates a multiple transmission reception point (mTRP) transmission mode or a single transmission reception point (sTRP) transmission mode associated with the PUSCH transmission; and transmitting the DCI message to a user equipment (UE), wherein one or more fields in the DCI message are associated with one or more zero padding types based on one or more of a value of the waveform selection field or a value of the SRS resource set indication field.

20. The method of claim 19, wherein:

the waveform selection field indicates whether the waveform type associated with the PUSCH transmission is a cyclic prefix orthogonal frequency division multiplexing (CP-OFDM) waveform or a discrete Fourier transform spread orthogonal frequency division multiplexing (DFT-s-OFDM) waveform, and the SRS resource set indication field indicates whether the PUSCH transmission is associated with a single frequency network (SFN) mTRP transmission mode or the sTRP transmission mode.

21. The method of claim 20, wherein each field in the DCI message that depends on both the value of the waveform selection field and the value of the SRS resource set indication field has a size corresponding to a maximum size for the field based on the one or more zero padding types including a per DCI field alignment applied to the waveform selection field and the SRS resource set indication field.

22. The method of claim 20, wherein the fixed size of the DCI message corresponds to a maximum size for the DCI message based on the one or more zero padding types including a per DCI format alignment applied to the waveform selection field and the SRS resource set indication field.

23. The method of claim 19, wherein:

the SRS resource set indication field indicates whether the PUSCH transmission is associated with a spatial division multiplexing (SDM) mTRP transmission mode or the sTRP transmission mode, and the waveform selection field indicates:

that the waveform type associated with the PUSCH transmission is a cyclic prefix orthogonal frequency division multiplexing (CP-OFDM) waveform based on the SRS resource set indication field indicating that the PUSCH transmission is associated with the SDM mTRP transmission mode, or whether the waveform type associated with the PUSCH transmission is the CP-OFDM waveform or a discrete Fourier transform spread orthogonal frequency division multiplexing (DFT-s-OFDM) waveform based on the SRS resource set indication field indicating that the PUSCH transmission is associated with the sTRP transmission mode.

24. The method of claim 23, wherein a size of each field in the DCI message that depends on the value of the waveform selection field and the value of the SRS resource set indication field has a size corresponding to a maximum size for the field based on the one or more zero padding types including a per DCI field alignment applied to the waveform selection field and the SRS resource set indication field.

25. The method of claim 23, wherein a size of the DCI message corresponds to a maximum size for the DCI message based on the one or more zero padding types including a per DCI format alignment applied to the waveform selection field and the SRS resource set indication field.

26. The method of claim 23, wherein:

the SRS resource set indication field indicates whether the PUSCH transmission is associated with the mTRP transmission mode or the sTRP transmission mode, and the DCI message includes a cyclic redundancy check (CRC) scrambled by a cell radio network temporary identifier (C-RNTI) or a configured scheduling radio network temporary identifier (CS-RNTI).

27. The method of claim 19, further comprising:

receiving, from the UE, signaling that indicates a capability to support one or more of dynamic waveform switching or dynamic switching between the mTRP transmission mode and the sTRP transmission mode based on a zero padding type associated with the DCI message, wherein the one or more zero padding types associated with the one or more fields in the DCI message are based on the capability.

28. The method of claim 19, further comprising:

receiving, from the UE, signaling that indicates a capability to jointly support dynamic waveform switching and dynamic switching between the mTRP transmission mode and the sTRP transmission mode, wherein the one or more zero padding types associated with the one or more fields in the DCI message are based on the capability.

29. A user equipment (UE) for wireless communication, comprising:

a memory; and one or more processors, coupled to the memory, configured to:

receive, from a network node, a downlink control information (DCI) message that schedules a physical uplink shared channel (PUSCH) transmission, wherein the DCI message has a fixed size based on one or more zero padding types of a plurality of zero padding types, and wherein the DCI message includes:

a waveform selection field that indicates a waveform type associated with the PUSCH transmission, and a sounding reference signal (SRS) resource set indication field that indicates a multiple transmission reception point (mTRP) transmission mode or a single transmission reception point (sTRP) transmission mode associated with the PUSCH transmission; and decode the DCI message based on the one or more zero padding types associated with one or more fields in the DCI message that depend on one or more of a value of the waveform selection field or a value of the SRS resource set indication field.

30. A network node for wireless communication, comprising:

a memory; and one or more processors, coupled to the memory, configured to:

generate a downlink control information (DCI) message, wherein the DCI message has a fixed size based on one or more zero padding types of a plurality of zero padding types, and wherein the DCI message includes:

a waveform selection field that indicates a waveform type associated with a physical uplink shared channel (PUSCH) transmission, and a sounding reference signal (SRS) resource set indication field that indicates a multiple transmission reception point (mTRP) transmission mode or a single transmission reception point (sTRP) transmission mode associated with the PUSCH transmission; and transmit the DCI message to a user equipment (UE), wherein one or more fields in the DCI message are associated with one or more zero padding types based on one or more of a value of the waveform selection field or a value of the SRS resource set indication field.

* * * * *